United States Patent
Susanna et al.

(10) Patent No.: US 11,661,498 B2
(45) Date of Patent: May 30, 2023

(54) PROCESS FOR PREPARING COMPOUNDS FOR TYRES AND TYRES COMPRISING THEM

(71) Applicant: Pirelli Tyre S.p.A., Milan (IT)

(72) Inventors: Antonio Susanna, Milan (IT); Raffaella Donetti, Milan (IT); Luca Giannini, Milan (IT); Thomas Hanel, Milan (IT); Roberto Scotti, Milan (IT); Barbara Di Credico, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 277 days.

(21) Appl. No.: 17/282,463

(22) PCT Filed: Oct. 9, 2019

(86) PCT No.: PCT/IB2019/058600
§ 371 (c)(1),
(2) Date: Apr. 2, 2021

(87) PCT Pub. No.: WO2020/075085
PCT Pub. Date: Apr. 16, 2020

(65) Prior Publication Data
US 2021/0380785 A1 Dec. 9, 2021

(30) Foreign Application Priority Data

Oct. 10, 2018 (IT) .................. 102018000009327

(51) Int. Cl.
| | | |
|---|---|---|
| *C08L 9/02* | (2006.01) | |
| *C08L 9/06* | (2006.01) | |
| *C08K 3/36* | (2006.01) | |
| *C08K 3/08* | (2006.01) | |
| *B60C 1/00* | (2006.01) | |
| *C08K 5/5419* | (2006.01) | |

(52) U.S. Cl.
CPC .................. *C08L 9/02* (2013.01); *B60C 1/00* (2013.01); *C08K 3/08* (2013.01); *C08K 3/36* (2013.01); *C08K 5/5419* (2013.01); *C08L 9/06* (2013.01); *C08K 2003/0893* (2013.01)

(58) Field of Classification Search
CPC .... C08L 9/02; C08L 9/06; C08K 3/36; C08K 3/08; B60C 1/00
USPC .......................................................... 524/127
See application file for complete search history.

(56) References Cited

U.S. PATENT DOCUMENTS

| 7,635,729 B2 | 12/2009 | Nip | |
|---|---|---|---|
| 2005/0027054 A1* | 2/2005 | Zimmer | .................. C08K 3/22 |
| | | | 525/333.9 |
| 2007/0072959 A1 | 3/2007 | Nip | |
| 2018/0305504 A1 | 10/2018 | Kitago | |

FOREIGN PATENT DOCUMENTS

| CN | 106751837 A | 5/2017 |
|---|---|---|
| EP | 3 395 587 A1 | 10/2018 |

OTHER PUBLICATIONS

International Search Report form the European Patent Office in corresponding International Application No. PCT/IB2019/058600 dated Jan. 23, 2020.
Written Opinion of the International Searching Authority from the European Patent Office in corresponding International Application No. PCT/IB2019/058600 dated Jan. 23, 2020.
Susanna, A. et al., "ZnO nanoparticles anchored to silica filler. A curing accelerator for isoprene rubber composites", Chemical Engineering Journal, Apr. 2015, vol. 275, pp. 245-252.
Susanna, A. et al., "Catalytic effect of ZnO anchored silica nanoparticles on rubber vulcanization and crosslinkformation" European Polymer Journal 93, 2017, pp. 63-74.
Flory, P., "Thermodynamics of High Polymer Solutions", AIP The Journal of Chemical Physics, Jan. 1942, vol. 10, pp. 51-61.
Maghami, S., "Functionalized SBRs In Silica-Reinforced Tire Tread Compounds: Evidence for Interactions Between Silica Filler and Zinc Oxide", Rubber Chemistry and Technology, 2016, vol. 89, No. 4, pp. 559-572.
Yuliya, V., "Controlled growth of ZnO nanocrystals on the surface of $SiO_2$ speres", Solid state Phenomena, 2009, vol. 151, pp. 264-268.
Ideda, Y., "Dinuclear Bridging Bidentate Zinc/Stearate Complex in Sulfur Cross-Linking of Rubber", American Chemical Society, Macromolecules, 2015, 48, pp. 462-475.

* cited by examiner

*Primary Examiner* — Deve V Hall
(74) *Attorney, Agent, or Firm* — Finnegan, Henderson, Farabow, Garrett & Dunner, L.L.P.

(57) ABSTRACT

The present invention relates to a process for preparing a vulcanisable elastomeric compound for tyres, characterised by the use of a particular vulcanisation-activating filler and by the methods of adding additives, in particular the compatibilising agent (silane), which occurs only after completion of the reaction between the activating filler comprising zinc and the fatty acid (stearic acid). The present process, advantageous in itself due to the possible reduction of the times and of the energy required for vulcanisation, allows preparing compounds which, with the same performances compared to the traditional ones, can have a reduced zinc content, and consequently a lower release thereof from tyres during use at an environmental level.

18 Claims, 5 Drawing Sheets

PROCESS FOR PREPARING COMPOUNDS FOR TYRES AND TYRES COMPRISING THEM

This application is a national stage filing under 35 U.S.C. § 371 of International Application No. PCT/IB2019/058600, filed on Oct. 9, 2019, which claims priority to Italian Patent Application No. 102018000009327, filed on Oct. 10, 2018; the content of each application is incorporated herein by reference in their entirety.

FIELD OF THE INVENTION

The present invention relates to a process for preparing elastomeric compounds for tyres with reduced zinc content, characterised by the incorporation of particular vulcanisation-activating fillers and by a precise sequence of adding some components of the compound.

PRIOR ART

In the tyre industry, vulcanisation is a process commonly used to improve the mechanical properties of natural rubber or unsaturated polymers, a process that affects hardness, elasticity, hysteresis of the material at different temperatures and, consequently, behaviour of the tyre on wet as well as friction and abrasion thereof during use.

Over the years, various additives have been proposed to improve the vulcanisation process as vulcanisation activators and accelerants.

In general, with these additives, it is desired to increase the degree and homogeneity of the cross-linking while decreasing the energy and the time required to complete the reaction.

The main vulcanisation activators, capable of increasing the efficiency of the process, are inorganic compounds such as metal oxides and hydroxides, for example ZnO, MgO, $Ca(OH)_2$.

Among the different activators, zinc oxide ZnO is considered the most efficient and is still in use today in many vulcanisation processes. This activator is used in combination with weak organic acids (e.g. stearic acid) which promote the activity thereof in the rubber.

Some studies—see for example the article by Y. Ikeda, et al. *Dinuclear bridging bidentate zinc/stearate complex in sulfur cross-linking of rubber*, Macromolecules 48 (2015) 462-475)—have suggested that $Zn^{2+}$ ions, generated by the interaction of ZnO with stearic acid, interact with the molecules of accelerant and sulphur forming organo-metal complexes that would act as more efficient sulphuring agents.

A hypothesis of structure of these complexes is illustrated in FIG. 3 of the present description.

The ability of $Zn^{2+}$ to form these complexes is a key element of the vulcanisation process and strongly depends on the dispersion of ZnO within the polymeric matrix, in turn influenced both by the size of the particles and by the crystalline structure of zinc oxide.

Typically, in the vulcanization processes of rubbers for tyres, microcrystalline ZnO is used as an activator which however does not readily disperse in the polymeric matrix and reacts only in part with the other vulcanising agents.

The poor dispersibility and reactivity of the microcrystalline zinc oxide in the elastomeric compound inevitably leads to an overdosing thereof with respect to the amount actually required for cross-linking.

During the use of the tyre, especially due to the abrasion of the tread on the asphalt, the zinc present in the compounds is partly released.

Therefore, out of respect for the environment, over the years it has been tried to reduce the quantity of zinc in the compounds.

For example, it has been tried to use finer ZnO (nanometric particles) but the dispersion was still difficult due to the formation of aggregates within the polymeric matrix, effectively eliminating the dimensional advantage compared to microcrystalline zinc oxide.

On the other hand, it has been proved advantageous the use of products consisting of zinc oxide nanoparticles directly linked to silica nanoparticles, compounds having the dual function of filler and vulcanization activators (hereinafter referred to generically as activating fillers or specifically as $ZnO/SiO_2$) (see the articles A. Susanna et al. *ZnO nanoparticles anchored to silica filler. A curing accelerator for isoprene rubber composites*, Chemical Engineering Journal 275 (2015) 245-252) and A. Susanna et al., *Catalytic effect of ZnO anchored silica nanoparticles on rubber vulcanization and cross-link formation*, European Polymer Journal 93 (2017) 63-74).

According to the authors, compared to the conventional microcrystalline ZnO, these activating fillers lead to a higher vulcanization efficiency, which involves a) a faster reaction of the ZnO with the stearic acid and the vulcanising agents to form more reactive sulphur complexes, b) greater cross-linking in the compound with more homogeneous distribution of the bonds and preferential formation of mono- and disulphide bridges between the polymeric chains and, finally, c) a more homogeneous dispersion of the nanoparticles with the absence of unreacted ZnO aggregates within the polymeric matrix, at the end of the vulcanization process.

All these aspects make the above activating fillers promising substitutes for microcrystalline zinc oxide in the vulcanization of tyre compounds, allowing a lower use of zinc, with important implications for environmental sustainability.

SUMMARY OF THE INVENTION

The Applicant has undertaken studies to further improve the effectiveness of the activating fillers described above in the production of compounds for tyres, with the aim of further reducing the zinc content for vulcanization and, therefore, contain environmental pollution from zinc release, and at the same time maintaining or possibly improving process conditions, yields and above all the properties of the final elastomeric compounds.

Surprisingly, the Applicant has found that if the order of addition of some additives is suitably defined in the preparation process of the compound, in particular by introducing the compatibilising agent (silane) only after completion of the reaction between the activating filler ($ZnO/SiO_2$) and the fatty acid (stearic acid) it is possible to achieve the desired objects.

The Applicant has verified that, in addition to the reduction of the times and of the energy required for the vulcanisation, the compounds thus prepared, with the same content of activating fillers and zinc, show a better cross-linking.

Moreover, the hysteretic properties shown by these compounds allow providing generally lower rolling resistance and better abrasion resistance as well as, in the possible tread application, a possible better grip of the tyre on the wet.

Furthermore, with the same performance or even better performance, the amount of activating filler and, ultimately, of zinc in the compounds can be reduced, thus reducing the release of this metal at an environmental level.

A first aspect of the present invention is a process for preparing a vulcanisable elastomeric compound for tyres, said process comprising at least:
- a step of mixing (1) at least one elastomeric polymer (A) and at least one additive for elastomeric compounds, with the exception of vulcanising agents (B), to give a non-vulcanisable elastomeric compound;
- a step of mixing (2) the non-vulcanisable elastomeric compound and at least one vulcanising agent (B), to give a vulcanisable elastomeric compound, and
- a step of unloading of the vulcanisable elastomeric compound, wherein in the mixing steps (1) and/or (2), at least one fatty acid (C), at least one product (D) comprising zinc directly bound to a white filler and at least one compatibilising agent (E) are added, characterised in that said at least one compatibilising agent (E) is added after the complete addition and processing of said at least one fatty acid (C) and at least one product (D) comprising zinc directly bound to a white filler.

A second aspect of the present invention is a vulcanisable elastomeric compound obtained according to the process of the first aspect of the present invention.

A third aspect of the present invention is a component of a tyre comprising the vulcanisable compound of the second aspect of the invention or the vulcanized compound obtained by vulcanization thereof.

A fourth aspect of the present invention is a tyre for vehicle wheels comprising a component according to the third aspect of the invention.

DEFINITIONS

For the purposes of the present description and of the following claims, the term "phr" (parts per hundreds of rubber) means the parts by weight of a given component of the elastomeric composition by 100 parts by weight of the diene elastomeric polymer.

Unless otherwise indicated, all the percentages are expressed as percentages by weight.

In the present description, the term "elastomeric polymer" or "rubber" or "elastomer" means a natural or synthetic polymer which, after vulcanisation, at room temperature can be stretched repeatedly to at least twice its original length and which, after removal of the tensile load substantially immediately returns with force to approximately its original length (according to the definitions of the ASTM D1566-11 Standard terminology relating to Rubber).

In the present description, the term "reinforcing filler" refers to a reinforcing material typically used in the sector to improve the mechanical properties of tyre rubbers, preferably selected from among carbon black, conventional silica, such as silica from sand precipitated with strong acids, preferably amorphous, diatomaceous earth, calcium carbonate, titanium dioxide, talc, alumina, aluminosilicates, kaolin, silicate fibres and mixtures thereof.

In the present description, the term "white filler" refers to a conventional reinforcing material used in the sector selected from among conventional silica and silicates, such as sepiolite, paligorskite also known as attapulgite, montmorillonite, alloisite and the like, possibly modified by acid treatment and/or derivatised. Typically, white fillers have surface hydroxyl groups.

In the present description, the term "vulcanisation-activating" indicates a compound capable of facilitating the vulcanisation, making it happen in shorter times and possibly at lower temperatures.

In the present description, the terms "activating filler" or "product (D) comprising zinc directly linked to a white filler" are used interchangeably and indicate a product capable of performing both a function of reinforcement of the compound and of vulcanisation activator, formed by a white filler and a zinc product in which zinc is directly bound to the surface hydroxyl groups of the filler. In particular, as indicated in the article by A. Susanna et al, *Chemical Engineering Journal* 275 (2015) 245-252, zinc binds directly to the surface hydroxyl groups of the white filler, without the interposition of any group or spacer, with bonds of the type Zn—O—Si, detectable for example through $Si^{29}$-NMR analysis. In the present description, this direct bond will also be referred to as the "anchoring" of the zinc to the white filler.

In the present description, the term "zinc compound" means a compound selected from ZnO, $Zn(OH)_2$, and the organic or inorganic salts of $Zn^{2+}$.

In the present description, the term "elastomeric compound" refers to the product obtained by mixing and, optionally, heating at least one elastomeric polymer with at least one of the additives commonly used in the preparation of tyre compounds.

In the present description, the term "non-vulcanisable elastomeric compound" means the product obtained by mixing at least one elastomeric polymer with at least one of the additives commonly used in the preparation of tire compounds, with the exception of vulcanising agents. A non-vulcanisable elastomeric compound can also be referred to as a phase (1) elastomeric compound.

In the present description, the term "vulcanisable elastomeric compound" means an elastomeric compound ready for vulcanisation, in which all the additives including those of vulcanisation have been incorporated. A vulcanisable elastomeric compound can also be referred to as a phase (2) elastomeric compound.

In the present description, the term "vulcanised elastomeric compound" means the material obtained by vulcanisation of a vulcanisable elastomeric compound.

In the present description, the term "conventional process" referring to the compound preparation process, indicates a multi-step preparation process in which the compatibilising agent (silane) is fed before the reaction between the fatty acid and zinc has started or has been completed. In a conventional process, therefore, the compatibilising agent is added at an earlier or concurrent step, with respect to the addition of fatty acid and/or zinc.

In the present description, the term "process according to the invention" referring to the preparation process of elastomeric compounds, indicates a multi-step preparation process in which the compatibilising agent (E) (silane) is introduced into the mixer only after the addition and processing of fatty acid (C) and of the product (D) comprising zinc directly bound to a white filler has been completed.

In the process according to the invention, the processing of the fatty acid (C) and of the product (D) comprising zinc directly bound to a white filler is continued for at least the time necessary for the substantial completion of the reaction between fatty acid and zinc.

In the present description, the term "mixing step (1)" indicates the step of the production process of the elastomeric compound in which one or more additives can be incorporated by mixing and possibly heating, except those of vulcanisation which are fed in step (2).

This step can include multiple intermediate processes during which one or more of the additives are incorporated, except those of vulcanization, followed by further processing.

This step can include a "chewing step", herein also referred to as "step 1-0", that is an initial step during which the one or more diene elastomeric polymers (A) are worked mechanically, possibly hot and possibly with the addition of one or more additives, generally excluding those of vulcanization and of the compatibilising agent (E), in order to form the elastomeric mass and make it more workable and homogeneous. In this step, the polymer is generally processed, possibly with plasticisers, lowering the viscosity thereof and increasing the exposed surface thereof, thus making it easier to incorporate additives, in particular fillers.

In the present description, the term "mixing step (2)" indicates the subsequent step of the production process of the elastomeric compound in which the vulcanisers and, preferably, the vulcanisation accelerants and/or retardants are introduced and mixed in the material, at a controlled temperature, generally at a mixing temperature lower than 160° C. The mixing step (1) is also referred to as the "non-productive step" since the components of the compound are fed to the mixing device, except those of cross-linking (for example, sulphur and accelerants).

The mixing step (2) is instead referred to as the production step. In this step, the elastomeric compound obtained from step (1) and the vulcanization additives capable of favouring and/or controlling cross-linking are fed to the mixing device, so as to provide the vulcanisable elastomeric compound.

In the present description, the term "discontinuous or batch mixer" indicates a mixing device adapted to be periodically fed with the elastomeric composition components in predefined amounts (batches) and mix them for a predetermined time so as to obtain the elastomeric composition. At the end of mixing, the resulting elastomeric composition is fully unloaded from the mixing device in a single solution.

Typically, a batch mixer comprises a pair of tangential or interpenetrating rotors housed in a mixing chamber and rotating in opposite direction, so as to mix the components introduced into the mixing chamber through its top.

To this end, the batch mixer may be provided with a pneumatic or hydraulic cylinder positioned at the top of the mixing chamber and a piston that moves both upwards, to open the mixing chamber, thereby allowing the introduction of ingredients of the composition by specific loading hoppers, and downwards, so as to exert pressure on the material being worked in the mixing chamber and located above the pair of rotors.

A pneumatic or hydraulic system positioned on the bottom of the mixing chamber enables the unloading of the elastomeric composition at the end of the mixing cycle through the opening of a dedicated inlet.

Specific examples of batch mixers that can be advantageously used according to the present invention are of the closed (Banbury®, Intermix®, Tandem Mixer HF) or open (open mill or Z-blade) type.

In the present description, the term "continuous mixer" indicates a mixing device suitable for receiving the ingredients of an elastomeric composition as a continuous feeding, mixing and/or reworking them in order to produce and unload an elastomeric composition in a continuous stream (except for possible stops of the mixing device due to maintenance, or elastomeric composition recipe change) in contrast to the periodic loading/unloading of the batch mixing device.

The continuous mixer is able to substantially mix the ingredients of an elastomeric composition, especially under cold-feeding/dosing conditions, and to chew the elastomeric material, thereby raising the temperature thereof in order to make it workable and plastic to facilitate the incorporation and/or distribution of the ingredients within the polymeric matrix. The continuous mixer is therefore mainly provided with mixing portions able to impart a high shear stress to the composition, and with any redistribution portions. The continuous mixer is further provided with transport portions capable of carrying the composition being worked from one longitudinal end to the other one of the inner chamber. Examples of continuous mixing devices are continuous twin-screw or multi-screw (e.g. ring mixers), penetrating and co-rotating, or planetary mixing devices.

The term 'planetary mixer' means a continuous mixing device having a central rotor and a plurality of satellites mixers, each of which, driven by the central rotor, rotates simultaneously about its own axis and about the central rotor.

Both the batch mixer and the continuous mixer are able to impart sufficient energy to the elastomeric composition to mix and disperse the filler in the elastomeric polymer even in case of cold feeding, unlike other elastomeric composition handling devices, such as conveyor devices and devices for manufacturing a semi-finished product.

In the present description, the term "green" is generally used to indicate a material, a compound, a composition, a component or a tyre not yet vulcanised.

DETAILED DESCRIPTION OF THE INVENTION

The process for preparing a vulcanisable elastomeric compound for tyres according to the invention will be illustrated in detail below.

This process is characterised by one or more of the following preferred aspects taken alone or in combination with each other, in particular by the use of at least one activating filler (D) and by the sequence of addition of some components.

The present process can be a continuous process but, preferably, it is a discontinuous process (batch).

The present process, when discontinuous, can be carried out in one or more mixers, preferably in a single mixer.

The process according to the invention comprises a mixing step (step 1) of at least one diene elastomeric polymer (A) and at least one additive for elastomeric compounds, which is not a vulcanising agent (B).

The at least one additive for elastomeric compounds which is mixed together with the at least one diene elastomeric polymer (A) in the mixing step (1) can be for example a fatty acid (C), a product (D) comprising zinc directly bound to a white filler, possibly a compatibilising agent (E), a reinforcing filler (H), an antioxidant (I), a wax (L), a plasticiser (M) and the like.

Generally in the mixing step (1) no vulcanising agent (B) is added and, preferably, not even vulcanisation accelerant agents (F) or retardant agents (G).

In one embodiment, the process according to the invention comprises a mixing step (step 1) of at least one diene elastomeric polymer (A), of at least one fatty acid (C), of at least one product (D) comprising zinc directly bound to a white filler and, only after the addition and processing thereof, at least one compatibilising agent (E).

In one embodiment, the process according to the invention comprises a mixing step (step 1) of at least one diene elastomeric polymer (A), at least one fatty acid (C) and at least one product (D) comprising zinc directly bound to a white filler. In this variant of the process, the at least one product (D) comprising zinc directly bound to a white filler and the at least one fatty acid (C) are processed in step (1) while the at least one compatibilising agent (E) is fed in step (2).

In one embodiment, the process according to the invention comprises a mixing step (step 1) of at least one diene elastomeric polymer (A), of at least one fatty acid (C), or of at least one product (D) comprising zinc directly bound to a white filler. In this variant of the process, the at least one product (D) comprising zinc directly bound to a white filler or the at least one fatty acid (C) respectively may be added and processed in step (2), followed by the addition of the at least one compatibilising agent (E).

The mixing step (1) of the present process may comprise several intermediate processing steps, herein referred to as step 1-0, 1-1, 1-2, 1-3 etc., distinguishable by the momentary interruption of the mixing and by the addition of one or more ingredients but without intermediate discharge of the compound.

Preferably, in the case of a batch process in which the mixing step (1) comprises several intermediate processing steps, the intermediate compounds are not discharged but reworked, with the addition of the appropriate additives, in the same mixer.

The mixing step (1) preferably comprises an initial chewing step (step 1-0) during which the at least one elastomeric polymer (A) is processed. In chewing, the polymer is subjected to mechanical and, preferably, thermal processing to reduce its viscosity, increase its exposed surface and workability, making it easier to incorporate the additives. Furthermore, in the case of mixtures of several polymers (A), chewing ensures a better homogeneity of the compound.

Optionally, the at least one fatty acid (C) and/or the at least one product (D) comprising zinc directly bound to a white filler or other step 1 additives but preferably not the compatibilising agent (E) can be incorporated in the chewing.

In the present process, the at least one fatty acid (C) can be fed, in whole or in part, in the mixing step (1).

Preferably, the fatty acid (C) is all fed in the mixing step (1).

Optionally, the fatty acid (C) can be fed in whole or in part in the chewing step (step 1-0), if present.

Alternatively, the addition of the fatty acid (C) may also be divided into several intermediate steps of the mixing step (1), provided that they precede the step of adding the compatibilising agent (E).

In the present process, in the mixing step (1) at least one product (D) comprising zinc directly bound to a white filler can be fed, in whole or in part.

Preferably, the product (D) comprising zinc directly bound to a white filler is all fed in step (1).

Optionally, the product (D) comprising zinc directly bound to a white filler can be fed in whole or in part in the chewing step (step 1-0), if present.

Alternatively, the addition of the product (D) comprising zinc directly bound to a white filler may also be divided into several intermediate steps of the mixing step (1), provided that they precede the step of adding the compatibilising agent (E).

Preferably, the product (D) comprising zinc directly bound to a white filler is not fed in the chewing step (step 1-0), if present.

In the present process, in the mixing step (1), if present, other additives can be optionally fed, in addition to the at least one fatty acid (C), the at least one product (D) comprising zinc directly bound to a white filler and the at least one compatibilising agent (E), such as for example oils and waxes.

In the present process, the optional chewing step (step 1-0) can be carried out in a batch mixer or in a continuous mixer as defined above, for times, for example, between 30 seconds to 2 minutes, at mixing temperatures typically from 70° C. to 155° C.

In the mixing step (1) at least one elastomeric polymer (A) and possibly at least one fatty acid (C) and/or at least one product (D) comprising zinc directly bound to a white filler are mixed, and optionally, if both the fatty acid (C) and the product (D) comprising zinc directly bound to a white filler are fed in this step, at least one compatibilising agent (E), provided that the compatibilising agent (E) if present in this step, is added subsequently to the feeding and processing of the fatty acid (C) and of the product (D) comprising zinc directly bound to a white filler.

Preferably, the at least one fatty acid (C), the at least one product (D) comprising zinc directly bound to a white filler and the at least one compatibilising agent (E) are all fed in step (1), always so that the compatibilising agent (E) is added after the feeding and processing of the fatty acid (C) and of the product (D) comprising zinc directly bound to a white filler.

The addition of the at least one compatibilising agent (E) can take place in one or more of the possible intermediate steps of the mixing step (1), preferably not in the chewing step 1-0 or, alternatively, in whole or in part, in step (2), always on condition that the reaction between the at least one fatty acid (C) and the at least one product (D) comprising zinc directly bound to a white filler is substantially completed before the addition of the compatibilising agent (E).

Typically, the step of processing the at least one fatty acid (C) and the at least one product (D) comprising zinc directly bound to a white filler, during which the reaction between the fatty acid and the zinc takes place, is continued for at least 30 seconds or more at a mixing temperature preferably at least equal to, more preferably higher than, the melting temperature of the fatty acid, typically at a mixing temperature of at least 70° C. For example, the processing can be continued for at least 90 seconds and at a mixing temperature of at least 100° C., before adding the compatibilising agent (E). The man skilled in the art can conveniently modify the processing time and temperature depending, for example, on the type of mixer, the mass being processed, the type of polymer, the type of fatty acid and its melting temperature.

In step (1), mixing is carried out at mixing temperatures generally between 70 and 160° C. and for times typically between 2 and 20 minutes.

In the case of two or more intermediate steps, the man skilled in the art is able to decide the optimal operating conditions for each of them, taking into consideration the type and intended use of the compound, the type of mixer, the components to be worked in each intermediate step and the need to substantially complete the reaction between the fatty acid (C) and the product (D) comprising zinc directly bound to a white filler before the subsequent addition of the compatibilising agent (E).

As an indication, each intermediate step of step (1) is generally continued for a time ranging from 2 to 10 minutes and conducted at mixing temperatures ranging from 70 to 160° C.

In step (1) of the present process, the order of addition of the components of the compound may always vary provided that any compatibilising agent (E) is fed not before the substantial completion of the reaction between the fatty acid (C) and the product (D) comprising zinc directly bound to a white filler.

At the end of step (1), the elastomeric compound is fed to the same or to a different mixer, for the step of incorporating the vulcanising agents (step 2).

Before proceeding with step (2), it may be advantageous to carry out a step of discharge and/or rest of the non-vulcanisable elastomeric compound in order to allow the completion of any reactions.

Preferably, the compound of step (1) is discharged before proceeding with step (2). In the subsequent step (2), at least one vulcanising agent (B) is incorporated. Optionally, in step (2) at least one vulcanization accelerant agent (F), at least one vulcanization retardant agent (G) and if not already fully fed in the mixing step (1), the at least one fatty acid (C) and/or the at least one zinc compound anchored on a white filler (D) can be added and upon completion of their addition and processing, the at least one compatibilising agent (E).

The mixing step (2) of the present process may comprise several intermediate processing steps, referred to as step 2-0, 2-1, 2-2, etc., characterised by the momentary interruption of the mixing to allow the addition of one or more ingredients but without intermediate discharge of the compound.

In the preparation process of elastomeric compounds according to the invention, if the compatibiliser (E) is fed in more than one step, the addition of the at least one fatty acid (C) and the at least one product (D) comprising zinc directly bound to a white filler must take place in one or more steps preceding the first step of feeding the compatibilising agent (E).

In step (2) of the present process, the mixing temperature is generally kept below 160° C., preferably at 140° C., more preferably at 120° C., so as to avoid any undesired pre-cross-linking phenomenon.

Generally in step (2) the mixing can be carried out at mixing temperatures between 70 and 155° C. and for times between 2 and 10 minutes.

At the end of step (2), the present process involves a step of unloading the vulcanisable elastomeric compound which will be destined to the subsequent typical processing steps for the production of tyres and components thereof.

In one or more of the steps of the present process, other additives commonly used in the production of tyre compounds can be added, selected on the basis of the specific application for which the composition is intended. For example, the following may be added: anti-ageing agents, plasticisers, adhesives, anti-ozone agents, modifying resins, or mixtures thereof.

In the present process, the at least one diene elastomeric polymer (A) can be selected from those commonly used in sulphur-vulcanisable elastomeric compositions, which are particularly suitable for producing tyres, i.e. from among elastomeric polymers or copolymers with an unsaturated chain having a glass transition temperature (Tg) generally lower than 20° C., preferably in the range from 0° C. to −110° C.

Preferably, the diene elastomeric polymer has a weight average molecular weight (Mw) higher than 80000 g/mol.

These polymers or copolymers may be of natural origin or may be obtained by solution polymerization, emulsion polymerization or gas-phase polymerization of one or more conjugated diolefins, optionally mixed with at least one comonomer selected from monovinylarenes and/or polar comonomers in an amount not exceeding 60% by weight.

The conjugated diolefins generally contain from 4 to 12, preferably from 4 to 8 carbon atoms and may be selected, for example, from the group comprising: 1,3-butadiene, isoprene, 2,3-dimethyl-1,3-butadiene, 1,3-pentadiene, 1,3-hexadiene, 3-butyl-1,3-octadiene, 2-phenyl-1,3-butadiene and mixtures thereof. 1,3-butadiene and isoprene are particularly preferred.

Monovinylarenes, which may optionally be used as comonomers, generally contain from 8 to 20, preferably from 8 to 12 carbon atoms and may be selected, for example, from: styrene; 1-vinylnaphthalene; 2-vinylnaphthalene; various alkyl, cycloalkyl, aryl, alkylaryl or arylalkyl derivatives of styrene, such as, for example, α-methylstyrene, 3-methylstyrene, 4-propylstyrene, 4-cyclohexylstyrene, 4-dodecylstyrene, 2-ethyl-4-benzylstyrene, 4-p-tolyl-styrene, 4-(4-phenylbutyl)styrene, and mixtures thereof. Styrene is particularly preferred.

Polar comonomers that may optionally be used, can be selected, for example, from: vinylpyridine, vinylquinoline, acrylic acid and alkylacrylic acid esters, nitriles, or mixtures thereof, such as, for example, methyl acrylate, ethyl acrylate, methyl methacrylate, ethyl methacrylate, acrylonitrile and mixtures thereof.

Preferably, the diene elastomeric polymer (A) which can be used in the present invention can be selected, for example, from: cis-1,4-polyisoprene (natural or synthetic, preferably natural rubber), 3,4-polyisoprene, polybutadiene (in particular polybutadiene with a high content of 1,4-cis), optionally halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, and mixtures thereof.

The above vulcanisable elastomeric compound may possibly comprise an elastomeric polymer of one or more monoolefins with an olefinic comonomer or derivatives thereof (A'). The monoolefins can be selected from: ethylene and α-olefins generally containing from 3 to 12 carbon atoms, such as for example propylene, 1-butene, 1-pentene, 1-hexene, 1-octene and mixtures thereof. The following are preferred: copolymers selected from ethylene and an α-olefin, optionally with a diene; isobutene homopolymers or copolymers thereof with small amounts of a diene, which are optionally at least partially halogenated. The diene possibly present generally contains from 4 to 20 carbon atoms and is preferably selected from: 1,3-butadiene, isoprene, 1,4-hexadiene, 1,4-cyclohexadiene, 5-ethylidene-2-norbornene, 5-methylene-2-norbornene, vinylnorbornene and mixtures thereof. Among them, the following are particularly preferred: ethylene/propylene (EPR) copolymers or ethylene/propylene/diene (EPDM) copolymers; polyisobutene; butyl rubber; halobutyl rubbers, in particular chlorobutyl or bromobutyl rubbers; or mixtures thereof.

A diene elastomeric polymer (A) or an elastomeric polymer (A') functionalized by reaction with suitable terminating agents or coupling agents may also be used. In particular, the diene elastomeric polymers obtained by anionic polymerization in the presence of an organometallic initiator (in particular, an organolithium initiator) may be functionalised by reacting the residual organometallic groups derived from the initiator with suitable terminating agents or coupling agents such as, for example, imines, carbodiimides, alkyltin halides, substituted benzophenones, alkoxysilanes or aryloxysilanes.

In the present process for the preparation of the vulcanisable elastomeric compound, the at least one elastomeric polymer (A) may comprise one or more diene elastomeric polymers (A) as defined above in mixture which can be advantageously subjected to the chewing step (step 1-0) to be better blended.

In the present process, the quantity used of the at least one elastomeric polymer (A) or the mixture of two or more elastomeric polymers (A) as defined above amounts to a total of 100 phr.

In the present process, the at least one vulcanising agent (B) is preferably selected from sulphur, or alternatively, sulphur-containing molecules (sulphur donors), such as for example caprolactam disulphide (CLD), bis (trialcoxysilyl) propyl]polysulphides, dithiophosphates, phosphorylpolysulphide (SDT) and mixtures thereof.

Preferably, the vulcanising agent (B) is sulphur preferably selected from soluble sulphur (crystalline sulphur), insoluble sulphur (polymeric sulphur), (iii) oil-dispersed sulphur and mixtures thereof.

Commercial examples of suitable vulcanising agents (B) are the 65% sulphur known under the trade name of Rhenogran of Lanxess, the 67% sulphur known under the trade name of Crystex OT33 of Eastman, the 95% sulphur known under the trade name of Solvay SchwefelKC, the rhombic crystalline sulphur known under the trade name of Sulphur (1% oil and 0.3% silica) of Zolfindustria.

The vulcanising agent (B) may be present in the vulcanisable elastomeric compound in an overall amount generally of from 0.1 to 15 phr, preferably from 0.5 to 10 phr, even more preferably from 1 to 7 phr.

The present elastomeric compound may comprise one or more vulcanising agents (B) as defined above in a mixture.

In the present process, the vulcanising agent (B) is preferably used together with adjuvants such as vulcanisation accelerants and/or retardants known to those skilled in the art.

In the present process, preferably fatty acid (C) is selected from saturated or unsaturated fatty acids containing 8 to 26 carbon atoms, esters thereof, salts thereof and mixtures thereof.

The preferred fatty acids are lauric acid (C12), myristic acid (C14), palmitic acid (C16), stearic acid (C18), behenic acid (C22), lignoceric acid (C24).

Examples of fatty acid mixtures are the C18/C16 mixture (Stearic acid and Palmitic acid), C12/C14 (Lauric acid and Myristic acid), C22/C24 (Behenic acid and Lignoceric acid).

Preferably the fatty acid (C) is stearic acid or an ester or salt thereof, more preferably it is stearic acid.

In the present process of preparing the vulcanisable elastomeric compound, the total amount of fatty acid (C) is generally between 0.05 and 20 phr, preferably between 0.1 and 15 phr, more preferably between 0.5 and 5 phr.

The product (D) comprising zinc directly bound to a white filler or activating filler (D) is a preferably inorganic compound comprising a zinc product, preferably zinc oxide or zinc hydroxide, in which the zinc is bound directly to the surface of a white filler.

The zinc present in the product (D) is in the form, for example, of zinc oxide, zinc hydroxide, bivalent zinc salt, such as zinc acetate or a zinc silicate or mixtures thereof, and not of metal zinc ($Zn°$). Zinc is preferably present as zinc oxide.

Preferably, the product (D) comprising zinc directly bound to a white filler comprises zinc oxide anchored on silica.

Preferably, the zinc oxide anchored on the white filler is a zinc oxide in particles of average size between 3 nm and 100 nm, preferably between 4 and 10 nm (nanoparticles).

The nanoparticles of zinc oxide can be amorphous or crystalline, and of various morphology, for example spherical, tetragonal, orthorhombic, monoclinic or triclinic. Preferably, the zinc oxide nanoparticles are amorphous.

The zinc content in the product (D) comprising zinc directly bound to a white filler can generally range from 0.5 to 50% by weight, preferably from 1 to 25%, more preferably from 7 to 14% by weight with respect to the overall weight of the product (D).

The zinc content can be determined for example by ICP-AES (Inductively Coupled Plasma-Atomic Emission Spectroscopy) as reported in the experimental part.

The product (D) comprising zinc directly bound to a white filler preferably has a zinc oxide content of 1 to 65%, preferably 5 to 30%, more preferably 7 to 15% by weight with respect to the total weight of the product (D).

The white filler to which the zinc binds may be any conventional white reinforcing filler that has hydroxyl groups on the surface.

The white filler is preferably selected from conventional silica and silicates, in the form of fibres, flakes or granules, such as bentonite, nontronite, beidellite, volkonskoite, hectorite, saponite, sauconite, vermiculite, sericite, sepiolite, paligorskite also known as attapulgite, montmorillonite, alloisite and the like, possibly modified by acid treatment and/or derivatized, and mixtures thereof, more preferably it is silica.

The silica on which the zinc compound is anchored may vary in shape, specific surface area and size.

Examples of silica are a pyrogenic silica, a precipitated amorphous silica, a wet silica (hydrated silicic acid), or mixtures thereof.

Examples of suitable commercial silicas are the precipitated silica Rhodia Zeosil MP1165 (BET specific surface area 160 $m^2/g$), Ultrasil VN3 GR (BET specific surface area 180 $m^2/g$) and Zeosil 1115 MP (BET specific surface area 95-120 $m^2/g$).

Preferably, the silica has a specific surface area (BET) of at least 120 $m^2/g$, more preferably of at least 140 $m^2/g$.

Preferably, the silica has a specific surface area (BET) smaller than 220 $m^2/g$, more preferably smaller than or equal to 180 $m^2/g$.

FIG. 2 shows the TEM image—taken from *Chemical Engineering Journal* 275 (2015) 245-252—of an activating filler suitable for use in the present process comprising zinc oxide nanoparticles anchored on silica.

The product (D) comprising zinc directly bound to a white filler can be prepared and characterised according to known methods, for example as described in the articles Chem. Eng. 275 (2015), 245-252 or in Solid State Phenom. 151 (2009) 264-268 or as reported in the present experimental part.

In the present process of preparing the vulcanisable elastomeric compound, the total amount of product (D), comprising zinc directly bound to a white filler, in the elastomeric compound is between 1 and 100 phr, preferably between 5 and 80 phr, more preferably between 10 and 30 phr.

In the present process, at least one compatibilising agent (E) is added.

The term "compatibilising agent (E)" generally means a compound capable of interacting with a reinforcing filler, in particular a white filler such as silica, and binding it to the diene elastomeric polymer during vulcanisation.

In the present process, the compatibilising agent (E) is generally a silane selected from those having at least one hydrolysable group, which can be identified, for example, by the following general formula (I):

$$(R)_3Si-C_nH_{2n}-X \qquad (1)$$

where the R groups, which may be the same or different, are selected from alkyl, alkoxy or aryloxy groups or from halogen atoms, provided that at least one of the R groups is an alkoxy or aryloxy group or a halogen; n is an integer of from 1 to 6, inclusive; X is a group selected from: nitrous, mercapto, amino, epoxide, vinyl, imide, chlorine, $-(S)_m-C_nH_{2n}-Si-(R)_3$ and $-S-COR$, where m and n are integers of from 1 to 6 inclusive and the R groups are as defined above.

Preferred compatibilising agents (E) are bis(3-triethoxysilylpropyl)tetrasulphide (TESPT) and bis(3-triethoxyisilylpropyl)disulphide (TESPD).

A commercial example of a suitable compatibilising agent (E) is TESPT or bis(3-triethoxysilypropyl)tetrasulphide Si69 marketed by Evonik.

Preferably, the compatibilising agent (E) is introduced into the elastomeric compound in a total amount of between 0.1 phr and 20 phr, preferably between 0.5 phr and 10 phr.

The present elastomeric compound may comprise one or more compatibilising agents (E) as defined above in a mixture.

In the present process, the vulcanisation accelerant agent (F) is preferably selected from dithiocarbamates, guanidines, thioureas, thiazoles, sulphenamides, sulphenimides, thiurams, amines, xanthates and mixtures thereof.

Preferably, the accelerant agent (F) is selected from N-cyclohexyl-2-benzothiazol-sulphenamide (CBS), N-tert-butyl-2-benzothiazol-sulphenamide (TBBS) and mixtures thereof.

A commercial example of a suitable accelerant agent (F) is N-cyclohexyl-2-benzothiazol-sulphenamide Vulkacit® (CBS or CZ) marketed by Lanxess.

The accelerant agent (F) may be present in the vulcanisable elastomeric compound in an overall amount generally ranging between 0.05 phr and 10 phr, preferably between 0.1 phr and 5 phr.

The present elastomeric compound may comprise one or more accelerant agents (F) as defined above in a mixture.

In the present process, the vulcanisation retardant agent (G) may be selected for example from urea, phthalic anhydride, N-nitrosodiphenylamine N-cyclohexylthiophthalimide (CTP or PVI), and mixtures thereof.

A commercial example of a suitable retardant agent (G) is N-cyclohexylthiophthalimide VULKALENT G of Lanxess.

The retardant agent (G) may be present in the vulcanisable elastomeric compound in an amount generally ranging between 0.05 phr and 2 phr.

The present elastomeric compound may comprise one or more retardant agents (G) as defined above in a mixture.

Preferably in the present process, preferably in the mixing step (1), one or more optional additives may be fed such as for example at least one reinforcing filler (H), at least one antioxidant agent (1), at least one wax (L) and at least one plasticiser (M).

In the present process, by reinforcing filler (H) it is meant a conventional filler, which has not the zinc compound anchored to the surface.

In the present process, the reinforcing filler (H) is selected from carbon black, conventional silica, such as sand silica precipitated with strong acids, preferably amorphous, hydrotalcite, diatomaceous earth, calcium carbonate, titanium dioxide, talc, alumina, aluminosilicates, kaolin, silicate fibres and mixtures thereof.

Preferably, the further reinforcing filler (H) is selected from carbon black, conventional silica, silicate fibres and mixtures thereof, preferably it is silica.

Carbon black can be selected from those of standard grade for tyres, or having a surface area not smaller than 20 m²/g, more preferably greater than 50 m²/g (measured in accordance with the ASTM D6556-16 standard).

A commercial example of a suitable reinforcing filler (H) is the Zeosil 1165MP silica from Solvay Rhodia.

Commercial examples of carbon black are N375 or N234 marketed by Birla Group (India) or Cabot Corporation.

The reinforcing filler (H) may be present in the vulcanisable elastomeric compound in an amount generally ranging between 0 phr and 120 phr, preferably between 3 phr and 80 phr.

In one embodiment, the reinforcing filler (H) may be absent, in which case the reinforcing function is performed by the product (D).

For some applications, the elastomeric compound prepared according to the present process may comprise at least 1 phr, more preferably at least 2 phr, more preferably at least 3 or 4 phr of carbon black, which advantageously protects the elastomer from ageing caused by the action of ultraviolet radiation.

The present elastomeric compound may comprise one or more reinforcing fillers (H) as defined above in a mixture.

In the present process, as antioxidant (1), phenylenediamine, diphenylamine, dihydroquinoline, phenol, benzimidazole, hydroquinone and derivatives thereof, possibly in a mixture, may be used.

In the present process, the antioxidant agent (1) is preferably selected from N-isopropyl-N'-phenyl-p-phenylenediamine (IPPD), N-(1,3-dimethyl-butyl)-n'-phenyl-p-phenylenediamine (6PPD), N,N'-bis-(1,4-dimethyl-pentyl)-p-phenylenediamine (77PD), N,N'-bis-(1-ethyl-3-methyl-pentyl)-p-phenylenediamine (DOPD), N,N'-bis-(1,4-dimethyl-pentyl)-p-phenylenediamine, N,N'-diphenyl-p-phenylenediamine (DPPD), N,N'-ditolyl-p-phenylenediamine (DTPD), N,N'-di-beta-naphthyl-p-phenylenediamine (DNPD), N,N'-bis(1-methylheptyl)-p-phenylenediamine, N,N'-Di-sec-butyl-p-phenylenediamine (44PD), N-phenyl-N-cyclohexyl-p-phenylenediamine, N-phenyl-N'-1-methylheptyl-p-phenylenediamine and the like and mixtures thereof, preferably it is N-(1,3-dimethyl-butyl)-N'-phenyl-p-phenylenediamine (6PPD).

A commercial example of a suitable antioxidant agent (1) is 6PPD of Solutia/Eastman.

The antioxidant agent (I) may be present in the vulcanisable elastomeric compound in an overall amount generally ranging between 0 phr and 20 phr, preferably between 0.5 phr and 10 phr.

In the present process, the wax (L) may be for example a petroleum wax or a mixture of paraffins.

Commercial examples of suitable waxes are the Repsol N-paraffin mixture and the Antilux® 654 microcrystalline wax from Rhein Chemie.

The wax (L) may be present in the vulcanisable elastomeric compound in an overall amount generally ranging between 0 phr and 20 phr, preferably between 0.5 phr and 5 phr.

In the present process, in order to further improve the processability, the elastomeric compound may be admixed with at least one plasticiser agent (M) generally selected from mineral oils, vegetable oils, synthetic oils, polymers with a low molecular weight and mixtures thereof, such as, for example, aromatic oil, naphthenic oil, phthalates, soybean oil and mixtures thereof. The amount of plasticiser generally ranges from 0 phr and 70 phr, preferably from 5 phr to 30 phr. Preferably, the plasticising agent (M) is added in the chewing step of the polymer 1-0, if present.

By way of non-limiting example, some embodiments of the present process are set forth below.

In an embodiment of the present process, the order of addition of the components of the compound is as follows:
step 1-0: polymer (A);
step 1-1: fatty acid (C);
step 1-2: activating filler (D);
step 1-3: compatibilising agent (E);
step 2: vulcanising agent (B).

In an embodiment of the present process, the order of addition of the components of the compound is as follows:
step 1-0: polymer (A);
step 1-1: fatty acid (C);
step 1-2: activating filler (D);
step 1-3: compatibilising agent (E);
step 2: vulcanising agent (B) and compatibilising agent (E).

In an embodiment of the present process, the order of addition of the components of the compound is as follows:
step 1-0: polymer (A) and fatty acid (C);
step 1-1: fatty acid (C) and activating filler (D);
step 1-2: compatibilising agent (E);
step 2: vulcanising agent (B).

In an embodiment of the present process, the order of addition of the components of the compound is as follows:
step 1-0: polymer (A) and fatty acid (C);
step 1-1: activating filler (D);
step 1-2: compatibilising agent (E);
step 2: vulcanising agent (B).

In an embodiment of the present process, the order of addition of the components of the compound is as follows:
step 1-0: polymer (A);
step 1-1: filler (H), fatty acid (C) and antioxidant (1);
step 1-2: activating filler (D);
step 1-3: compatibilising agent (E);
step 2: vulcanising agent (B) and accelerant agent (F).

In an embodiment of the present process, the order of addition of the components of the compound is as follows:
step 1-0: polymer (A);
step 1-1: filler (H), fatty acid (C) and antioxidant (1);
step 1-2: activating filler (D);
step 1-3: compatibilising agent (E);
step 2: vulcanising agent (B), accelerant (F) and compatibilising agent (E).

In an embodiment of the present process, the order of addition of the components of the compound is as follows:
step 1-0: polymer (A) and fatty acid (C);
step 1-1: filler (H), fatty acid (C) and activating filler (D);
step 1-2: antioxidant (1), wax (L) and compatibilising agent (E);
step 2: vulcanising agent (B), accelerant (F) and retardant agent (G).

In an embodiment of the present process, the order of addition of the components of the compound is as follows:
step 1-0: polymer (A) and fatty acid (C);
step 1-1: filler (H) and activating filler (D);
step 1-2: antioxidant (1), wax (L) and compatibilising agent (E);
step 2: vulcanising agent (B), accelerant (F) and retardant agent (G).

A second aspect of the present invention is a vulcanisable elastomeric compound obtained according to the process described above.

Preferably, the vulcanisable elastomeric compound according to the invention comprises zinc in an amount lower than 4 phr, more preferably lower than 3 phr, even more preferably lower than 2 phr with a consequent advantage for the environment of a lower release thereof compared to conventional elastomeric compounds.

Preferably, the vulcanised elastomeric compound according to the invention comprises zinc in an amount lower than 4 phr, more preferably lower than 3 phr, even more preferably lower than 2 phr.

In the elastomeric compound according to the invention, zinc is generally present in various forms, for example in ionic form such as $Zn^{2+}$, covalently bound and/or complexed but not in the form of metallic zinc ($Zn°$).

The amount of zinc in the compound can be determined for example by X-ray fluorescence (XRF), as described in the experimental part.

The present vulcanisable elastomeric compound can be incorporated in one or more components of the tyre.

Due to the presence of the at least one vulcanising agent (B), the vulcanisable compound may be vulcanised according to known techniques.

Due to the use of the product (D) comprising zinc directly bound to a white filler as activator and to the postponed addition of the compatibilising agent (E) according to the present process, a complete and homogeneous dispersion of the zinc is obtained with undoubted advantages in the subsequent vulcanisation reaction of the elastomeric compound, such as a greater and more uniform cross-linking, the absence of unreacted zinc oxide aggregates, and in the properties of the vulcanised compound in terms of improvement of the load and elongation at break.

This particular reactivity is evidenced by the increase of mono- and disulphide bridges in the vulcanized compound, as measured in the present experimental part in Example 6 (Table 8) and by the reduction of the cross-linking times (see for example the values of T-MH of Tables 6, 10 or T90 of Table 12) and is reflected in the pattern of the normalised curves of the torque values shown in FIGS. 5 and 6. Moreover, the experiments reported herein prove that the elastomeric compound for tyres prepared according to the process of the invention is characterised, with the same zinc content, by a significant reduction in hot hysteresis (70° C. and 100° C.), predictive of a decrease in rolling resistance in use advantageous for the increase in the travel distance of the tyre, and/or an increase in cold hysteresis (10° C. and 23° C.), associated with better performance of the tyre on the wet.

Thanks to the present process, it is possible to reduce the quantity of zinc incorporated in the compounds, with important benefits for the environment, without deteriorating or even improving their performance compared to comparable conventional compounds.

According to a third aspect of the invention, the present elastomeric compound is applied to tyre components such as tread band, underlayer, anti-abrasive elongated element, sidewall, sidewall insert, mini-sidewall, under-liner, rubber layers, bead filler and sheet, more preferably in the tread band, in the under-layer and in the sidewall.

Preferably, the tyre component according to the invention consists of the vulcanisable compound according to the invention (green component) or of the vulcanised compound obtained by vulcanization thereof (vulcanized component).

A fourth aspect of the present invention is a tyre for vehicle wheels comprising at least one of the components indicated above.

Preferably, the tyre for vehicle wheels of the invention comprises at least one tyre component which consists of a vulcanisable elastomeric compound (green component) according to the second aspect of the invention or of a vulcanised elastomeric compound obtained by vulcanization thereof.

In one embodiment, a tyre for vehicles according to the present invention comprises at least
- a carcass structure comprising at least a carcass ply having opposite lateral edges associated to respective bead structure;
- possibly a pair of sidewalls applied to the lateral surfaces of the carcass structure, respectively, in an axially outer position;
- possibly a belt structure applied in radially outer position with respect to the carcass structure;
- a tread band applied in a radially outer position to said carcass structure or, if present, a belt structure,
- possibly a layer of elastomeric material, referred to as under-layer, applied in a radially inner position with respect to said tread band, wherein at least one component selected from said pair of sidewalls, said under-layer and said tread band comprises, or preferably consists of, the elastomeric compound according to the invention.

An embodiment according to the present invention relates to a tyre for high performance vehicles (HP, SUV and UHP), wherein at least one component, preferably selected from under-layer, sidewall and tread band, comprises, or preferably consists of, the elastomeric compound according to the invention.

An embodiment according to the present invention relates to a tyre for heavy vehicles in which at least one component, preferably selected from under-layer, sidewall and tread band, comprises, or preferably consists of, the elastomeric compound according to the invention.

The tyre according to the invention may be a tyre for two or four-wheeled vehicles.

In one embodiment, the tyre according to the invention is a tyre for bicycle wheels.

A tyre for bicycle wheels typically comprises a carcass structure turned around a pair of bead cores at the beads and a tread band arranged in a radially outer position with respect to the carcass structure.

The carcass structure is intended to withstand the inflation pressure and to support the weight of the bicycle and the cyclist. It comprises one or more carcass plies, each comprising a plurality of suitably oriented reinforcing cords. In the case of several carcass plies, they are inclined with respect to each other to form a crossed structure.

The bead cores have the task of ensuring that the tyre is anchored to the wheel rim.

In the radially inner position of the carcass structure, an air chamber may be provided in which pressurised air is introduced.

The tyre according to the invention can be for summer or winter use or for all seasons.

The tyre according to the present invention can be manufactured according to a process which comprises:
- building components of a green tyre on at least one forming drum;
- shaping, moulding and vulcanising the tyre;

wherein building at least one of the components of a green tyre comprises:
- manufacturing at least one green component comprising, or preferably consisting of, the vulcanisable elastomeric compound of the invention.

DESCRIPTION OF THE DRAWINGS

FIG. 1 shows a radial half-section of a tyre for vehicle wheels according to the invention.

In FIG. 1, "a" indicates an axial direction and "X" indicates a radial direction, in particular X-X indicates the outline of the equatorial plane. For simplicity, FIG. 1 shows only a portion of the tyre, the remaining portion not shown being identical and arranged symmetrically with respect to the equatorial plane "X-X".

Figure 1:
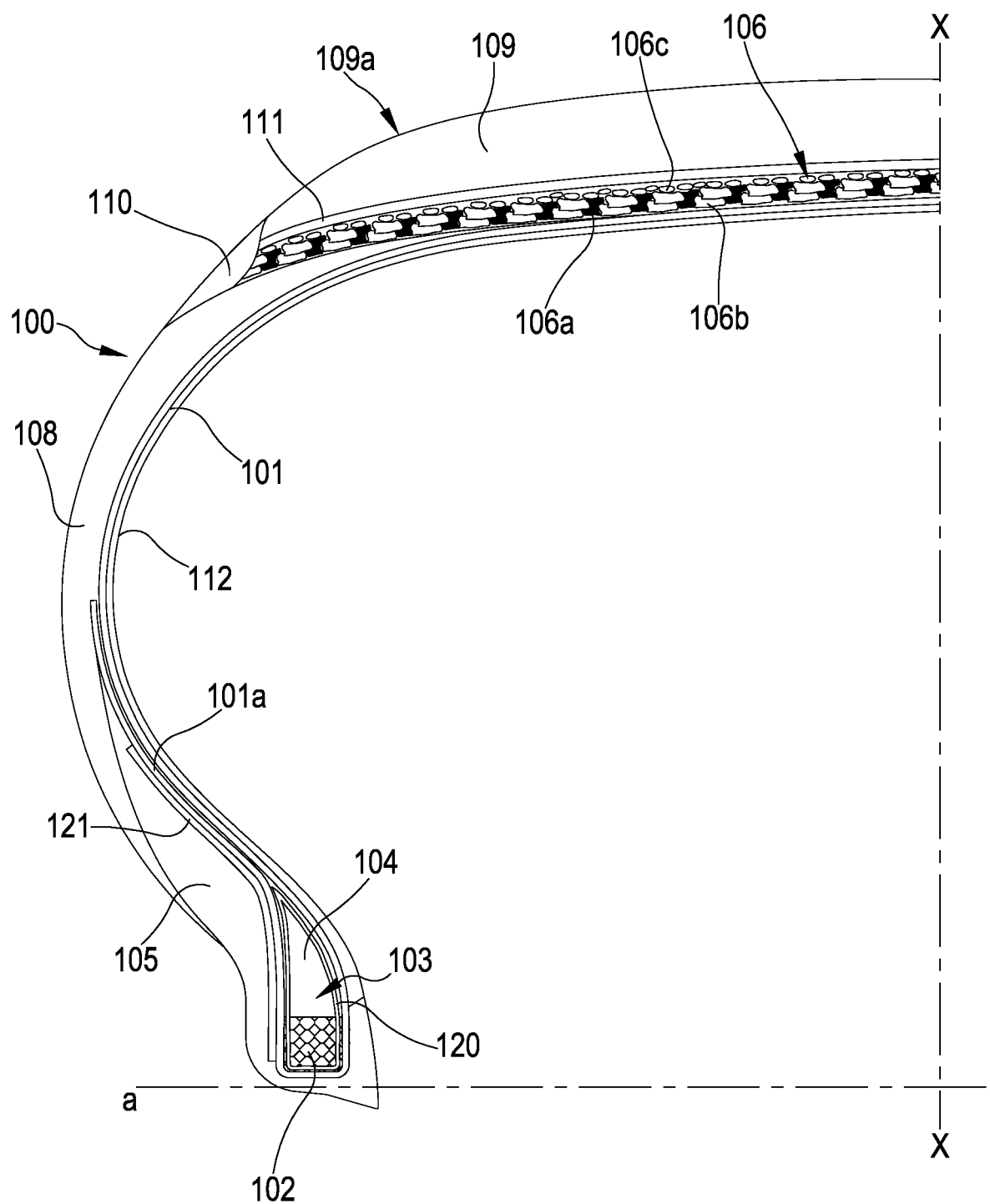
FIG. 1 shows a radial half-section of a tyre for vehicle wheels, comprising at least one component formed by an elastomeric compound prepared according to the process of the invention.

Tyre 100 for four-wheeled vehicles comprises at least one carcass structure, comprising at least one carcass layer 101 having respectively opposite end flaps engaged with respective annular anchoring structures 102, referred to as bead cores, possibly associated to a bead filler 104.

The carcass layer 101 is optionally made with an elastomeric compound.

The tyre area comprising the bead core 102 and the filler 104 forms a bead structure 103 intended for anchoring the tyre onto a corresponding mounting rim, not shown.

The carcass structure is usually of radial type, i.e. the reinforcing elements of the at least one carcass layer 101 lie on planes comprising the rotational axis of the tyre and substantially perpendicular to the equatorial plane of the tyre. Said reinforcement elements generally consist of textile cords, such as rayon, nylon, polyester (for example polyethylene naphthalate, PEN). Each bead structure is associated to the carcass structure by folding back of the opposite lateral edges of the at least one carcass layer 101 around the annular anchoring structure 102 so as to form the so-called carcass flaps 101a as shown in FIG. 1.

In one embodiment, the coupling between the carcass structure and the bead structure can be provided by a second carcass layer (not shown in FIG. 1) applied in an axially outer position with respect to the first carcass layer.

An anti-abrasive strip 105 optionally made with an elastomeric compound is arranged in an outer position of each bead structure 103.

The carcass structure is associated to a belt structure 106 comprising one or more belt layers 106a, 106b placed in radial superposition with respect to one another and with respect to the carcass layer, having typically textile and/or metallic reinforcement cords incorporated within a layer of vulcanised elastomeric compound.

Such reinforcement cords may have crossed orientation with respect to a direction of circumferential development of tyre 100. By "circumferential" direction it is meant a direction generally facing in the direction of rotation of the tyre.

At least one zero-degree reinforcement layer 106c, commonly known as a "0° belt", may be applied in a radially outermost position to the belt layers 106a, 106b, which generally incorporates a plurality of elongated reinforcement elements, typically metallic or textile cords, oriented in a substantially circumferential direction, thus forming an angle of a few degrees (such as an angle of between about 0° and 6°) with respect to a direction parallel to the equatorial plane of the tyre, and coated with vulcanised elastomeric compound.

A tread band 109 of vulcanised elastomeric compound is applied in a position radially outer to the belt structure 106.

Moreover, respective sidewalls 108 of vulcanised elastomeric compound are applied in an axially outer position on the lateral surfaces of the carcass structure, each extending from one of the lateral edges of tread 109 at the respective bead structure 103.

In a radially outer position, the tread band 109 has a rolling surface 109a intended to come in contact with the ground. Circumferential grooves, which are connected by transverse notches (not shown in FIG. 1) so as to define a plurality of blocks of various shapes and sizes distributed over the rolling surface 109a, are generally made on this surface 109a, which for simplicity is represented smooth in FIG. 1.

An under-layer 111 of vulcanised elastomeric compound can be arranged between the belt structure 106 and the tread band 109.

A strip consisting of elastomeric compound 110, commonly known as "mini-sidewall", of vulcanised elastomeric compound can optionally be provided in the connecting zone between sidewalls 108 and the tread band 109, this mini-sidewall generally being obtained by co-extrusion with the tread band 109 and allowing an improvement of the mechanical interaction between the tread band 109 and sidewalls 108. Preferably, the end portion of sidewall 108 directly covers the lateral edge of the tread band 109.

In the case of tubeless tyres, a rubber layer 112, generally known as "liner", which provides the necessary impermeability to the inflation air of the tyre, can also be provided in a radially inner position with respect to the carcass layer 101.

The rigidity of the tyre sidewall 108 can be improved by providing the bead structure 103 with a reinforcing layer 120 generally known as "flipper" or additional strip-like insert.

Flipper 120 is a reinforcing layer which is wound around the respective bead core 102 and the bead filler 104 so as to at least partially surround them, said reinforcing layer being arranged between the at least one carcass layer 101 and the bead structure 103. Usually, the flipper is in contact with said at least one carcass layer 101 and said bead structure 103.

Flipper 120 typically comprises a plurality of textile cords incorporated within a layer of vulcanised elastomeric compound.

The bead structure 103 of the tyre may comprise a further protective layer which is generally known by the term of "chafer" 121 or protective strip and which has the function of increasing the rigidity and integrity of the bead structure 103.

Chafer 121 usually comprises a plurality of cords incorporated within a rubber layer of vulcanised elastomeric compound. Such cords are generally made of textile materials (such as aramide or rayon) or metal materials (such as steel cords).

A layer or sheet of elastomeric compound can be arranged between the belt structure and the carcass structure. The layer can have a uniform thickness. Alternatively, the layer may have a variable thickness in the axial direction. For example, the layer may have a greater thickness close to its axially outer edges with respect to the central (crown) zone.

Advantageously, the layer or sheet can extend on a surface substantially corresponding to the extension surface of said belt structure.

In a preferred embodiment, a layer of elastomeric compound as described above, referred to as under-layer, can be placed between said belt structure and said tread band, said under-layer preferably extending on a surface substantially corresponding to the extension surface of said belt structure.

The elastomeric compound according to the present invention can be advantageously incorporated in one or more of the components of the tyre selected from the belt structure, carcass structure, tread band, under-layer, sidewall, mini-sidewall, sidewall insert, bead, flipper, chafer, sheet and anti-abrasive strip, preferably incorporated at least in the sidewalls and/or in the under-layer.

According to an embodiment not shown, the tyre may be a tyre for motorcycle wheels which is typically a tyre that has a straight section featuring a high tread camber.

According to an embodiment not shown, the tyre may be a tyre for bicycle wheels.

According to an embodiment not shown, the tyre may be a tyre for heavy transport vehicle wheels, such as trucks, buses, trailers, vans, and in general for vehicles in which the tyre is subjected to a high load. Preferably, such a tyre is adapted to be mounted on wheel rims having a diameter equal to or greater than 17.5 inches for directional or trailer wheels.

Figure 2:
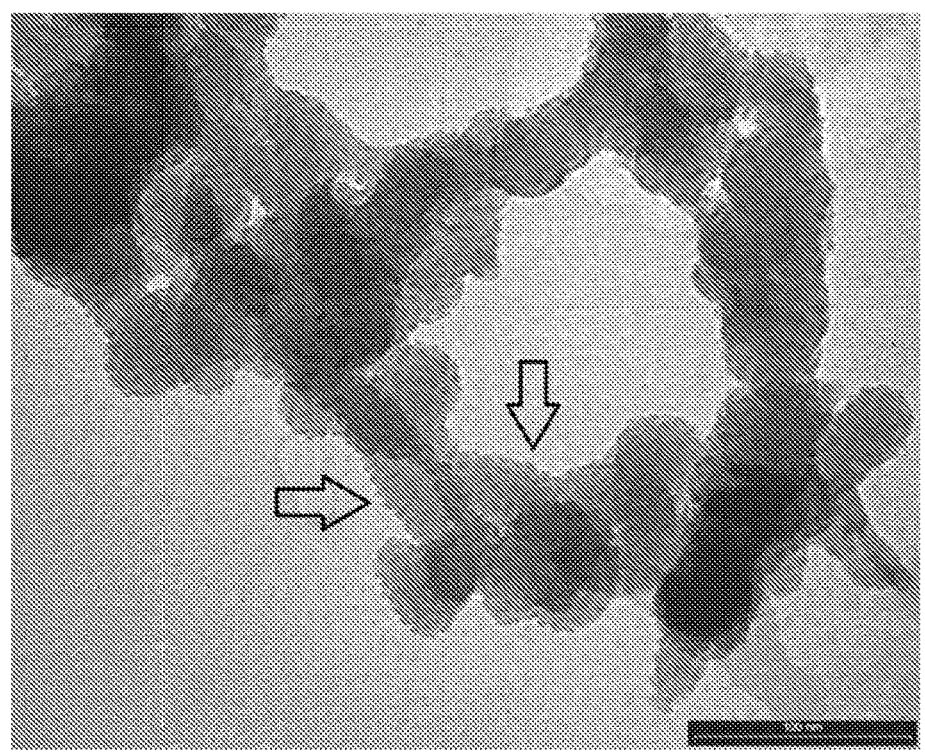

FIG. 2 is a microscopic image of a $ZnO/SiO_2$ (D) activating filler measured with a high resolution transmission electron microscope (HRTEM), which shows the zinc oxide particles anchored to the silica surface.

Figure 3:
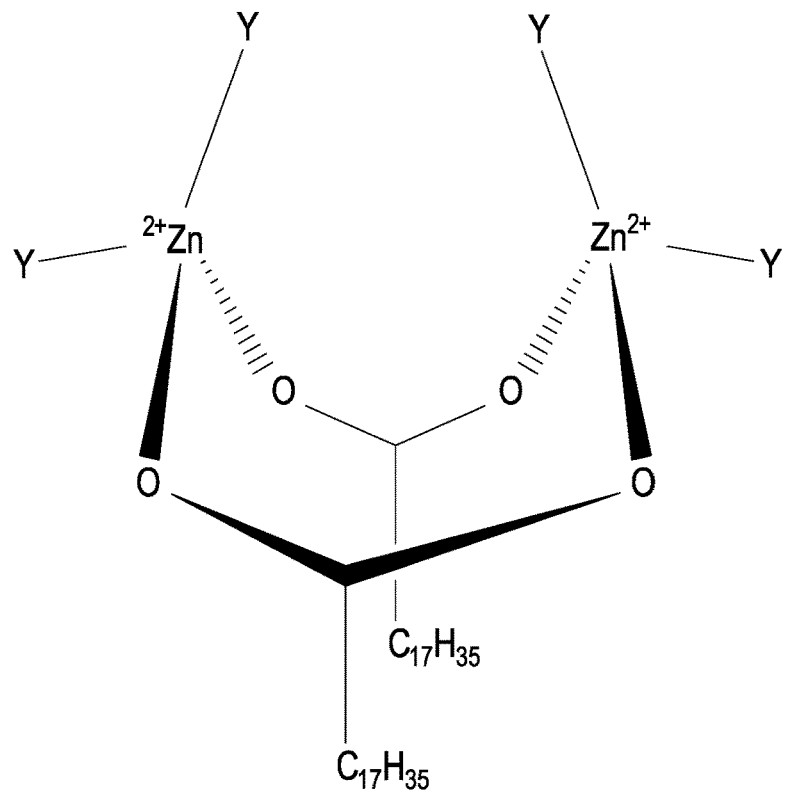

FIG. 3 schematically shows the possible structure of the complex which is formed by reaction between stearic acid and ZnO nanoparticles anchored on $SiO_2$, wherein Y represents a counter-ion such as an OH group or an acetate.

Figure 4:
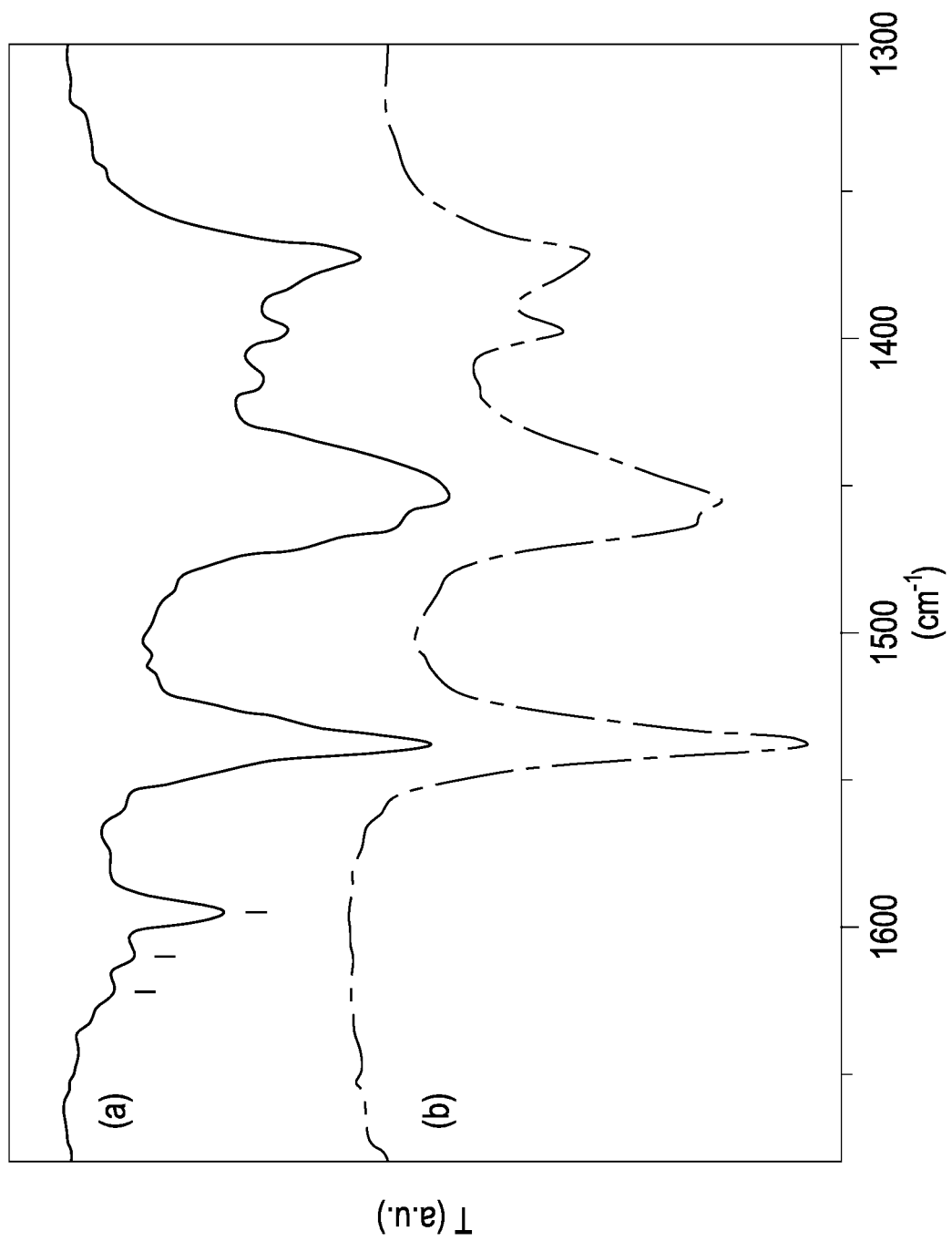

FIG. 4 is an ATR-FTIR spectroscopic image showing the formation of the complex shown in FIG. 2, by reaction between stearic acid and ZnO nanoparticles anchored on $SiO_2$ (graph a) in comparison to the standard ZnO and stearic acid system (graph b), heated at 120° C. for 5 minutes in a simplified vulcanisation model. In this model, low molecular weight molecules are used which mimic the reactivity of the polymer, such as for example 2,3-dimethyl-2-butene used to simulate isoprenic rubbers.

Figure 5:
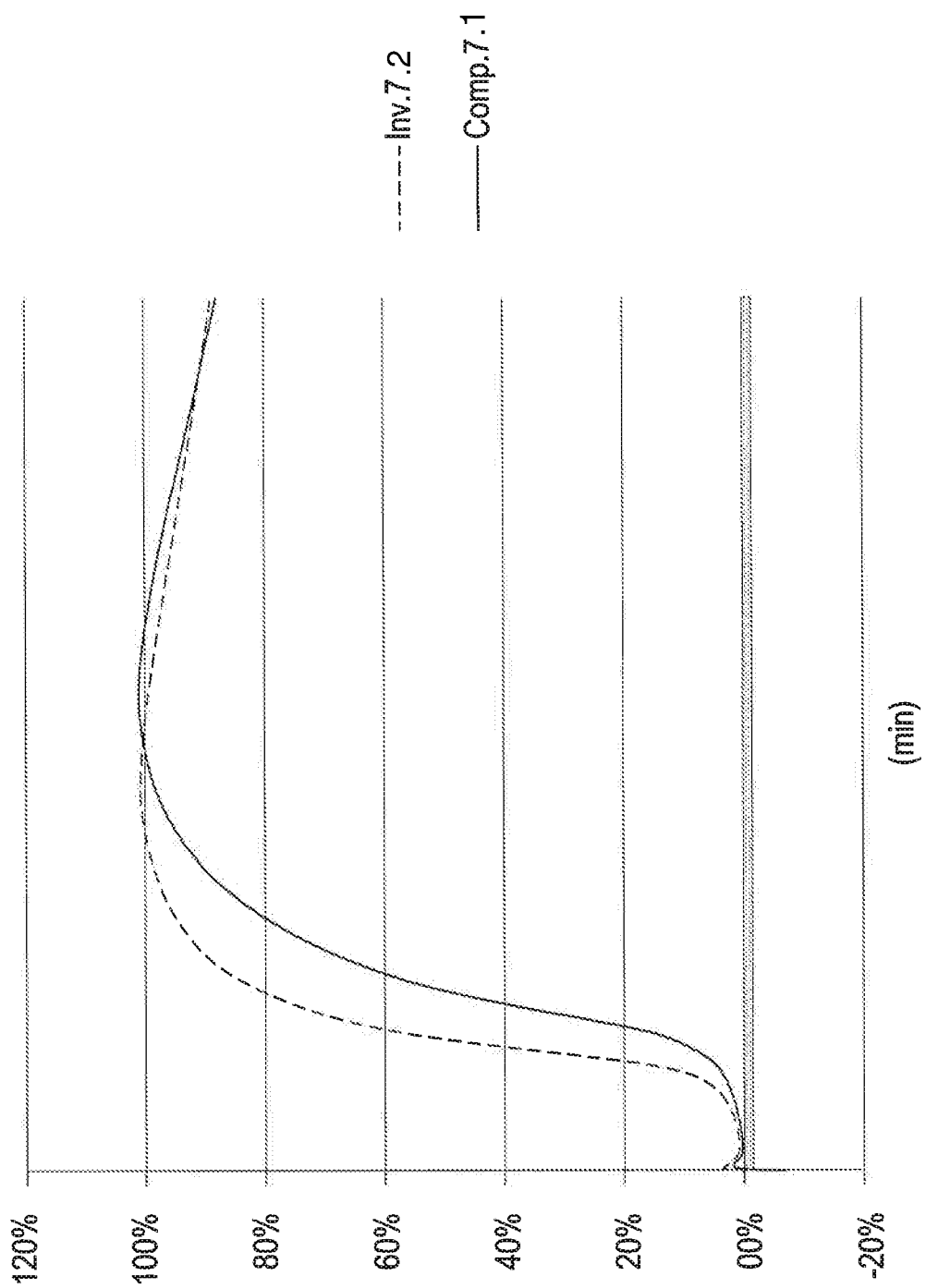
Figure 6:
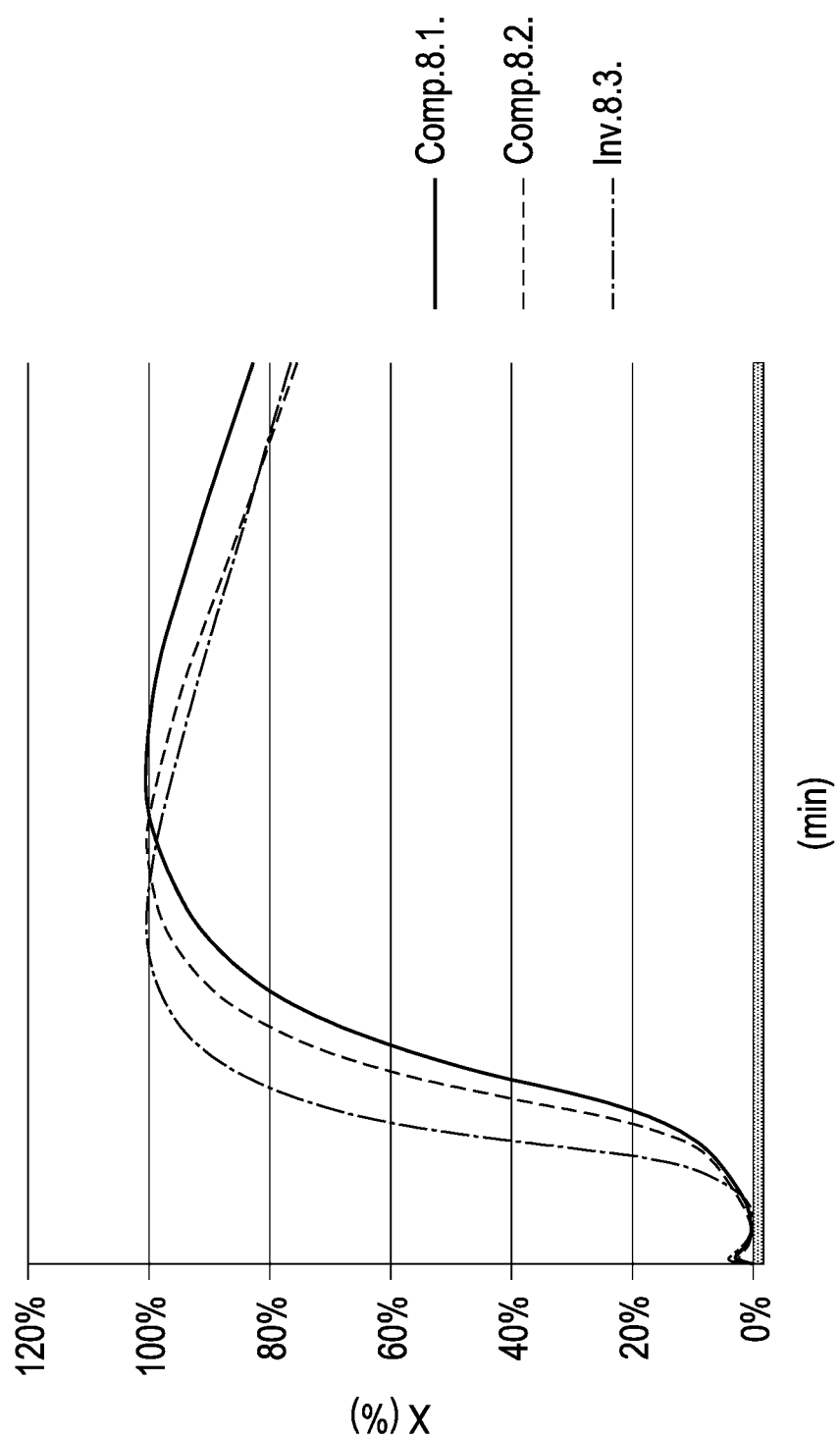

FIG. 5 shows the normalized curve of the torque values [(Sx−Smin)/(Smax−Smin)*100] measured over time (min) during the vulcanisation of a vulcanisable compound according to the invention and of a comparative compound (Ex. 7.2 and 7.1). FIG. 6 shows the normalized curve of the torque values [(Sx−Smin)/(Smax−Smin)*100] measured over time (min) during the vulcanisation of two comparative vulcanisable compounds (Ex. 8.1 and 8.2) and of a compound according to the invention (Ex. 8.3).

The description of some preparative examples according to the invention and comparative examples, given only for illustrative and non-limiting of the scope if the invention, is set out below.

EXPERIMENTAL PART

Analysis Methods

The ATR-FTIR analysis was performed with a Perkin Elmer Spectrum 100 instrument (spectra with a resolution of 4 $cm^{-1}$, region from 650 to 400 $cm^{-1}$, 32 scans) (see FIG. 4).

High Resolution Transmission Electron Microscopy (HR-TEM) was performed with a 300 KV Jeol 3010 microscope with a high resolution polar pole (point-to-point resolution 0.17 nm) and equipped with a slow-scan Gatan CCD 792 camera. The powders were suspended in isopropanol and a drop of 5 µl of this suspension was deposited on a perforated carbon film supported on a 3 mm copper grid for the TEM assay (see FIG. 2)

Determination of the Zinc Content in the Activating Filler (D)

The zinc oxide content anchored on a white filler (D) can be measured by ICP-AES spectrometry (Inductively Coupled Plasma-Atomic Emission Spectroscopy) with ICP simultaneous plasma spectrometer (TJA IRIS II model; excitation source: radiofrequency generator with 27.12 MHz frequency and variable output power up to 1750 W).

Determination of the Zinc Content in the Compound by X-Ray Fluorescence (XRF)

The X-ray fluorescence analysis is based on the emission effect produced by a primary X-ray beam of high intensity and appropriate energy, incident on the sample.

The sample was prepared by passing about 2 g of vulcanised compound between the cylinders of a cold laboratory mixer until a homogeneous and compact sheet with a thickness between 0.5 and 0.7 mm was obtained.

A circular specimen of about 4 cm in diameter was then cut from the sheet and was introduced into the instrument sample holder (wavelength dispersion X-ray fluorescence spectrometer, model ARL—XRF 8420+).

MDR rheometric analysis (according to ISO 6502): a rheometer Alpha Technologies type MDR2000 was used. The tests were carried out at 170° C. for 20 minutes at an oscillation frequency of 1.66 Hz (100 oscillations per minute) and an oscillation amplitude of 0.5°, measuring the time necessary to achieve an increase of two rheometric units (TS2) and the time necessary to achieve 30% (T30), 60% (T60), 90% (T90) and 100% (T-MH), respectively, of the maximum torque value (MH). The maximum torque value MH and the minimum torque value ML were measured and their difference was calculated (MH-ML).

Properties of Vulcanised Materials

The elastomeric materials prepared in the previous examples were vulcanised to give specimens on which analytical characterisations and the assessment of static and dynamic mechanical properties were conducted.

Unless otherwise indicated, vulcanisation was carried out in a mould, in hydraulic press at 170° C. and at a pressure of 200 bar for about 10 minutes.

The hardness in IRHD degrees (23° C.) was measured according to the ISO 48:2007 standard on samples of the elastomeric materials vulcanised under the conditions set out in the experimental part.

Determination of the Total Cross-Linking Degree and of the Mono- and Disulphide Bonds (% by Weight)

The measurement of the total quantity of bonds or degree of total cross-linking (total number of bonds expressed as moles per gram of compound, mol/g) was performed by exploiting the swelling effect of toluene on the compound. A highly cross-linked compound will have a lower tendency to absorb the solvent than a compound in which the cross-linking is lower. According to this principle, an inverse relationship was established between the amount of solvent absorbed and cross-linking. The quantity of absorbed solvent was determined gravimetrically by calculating the weight difference between the sample swollen at equilibrium with the solvent and the same sample after complete removal of the absorbed solvent, by vacuum drying. The technique of swelling in toluene was also used for the determination of the quantity of mono and disulphide bonds, however, preceded by a treatment with suitable reactants capable of selectively separating the polysulphide bonds. A mixture of piperidine and propan-2-thiol was used to cleave all the polysulphide bonds (containing 3 or more sulphur atoms). The subsequent swelling therefore measured only the contribution of the remaining mono and di-sulphur bonds.

The measurement of the total amount of the bonds and the determination of the mono and disulphide bonds were carried out in parallel on two different portions of the same sample, in two different reaction containers, according to the following procedure.

A sample of a vulcanised compound of 10×10×1 mm$^3$ (0.10±0.05 g) was immersed in toluene at 25° C. in a laboratory flask and kept in the dark for seven days. The toluene was replaced with fresh toluene after three days. On the seventh day, the swollen solid mass was weighed, then vacuum-dried at 70° C. for 12 hours and reweighed.

The volumetric fraction of the swollen rubber was calculated using this equation:

$$V_r = \frac{(m_d - fm_0) \cdot \rho_p^{-1}}{(m_d - fm_0) \cdot \rho_p^{-1} + m_{so} \cdot \rho_s^{-1}}$$

where $m_0$ is the weight of the compound before swelling; $m_{sw}$ the weight of the swollen compound; $m_d$ is the weight of the compound dried after swelling; $m_{so}$ is the weight of solvent within the swollen mass given by $m_{sw} - m_d$; $\rho_p = 0.94$ g·cm$^{-3}$ is the density of the polymer; $\rho_s = 0.87$ g·cm$^{-3}$ is the density of toluene; f is the filler fraction determined by TGA. The cross-link density (v), i.e. the number of chains bound by gram on two different polymer chains, was evaluated according to the Flory-Rehner equation [*Thermodynamics of high polymer solutions, J. Chem. Phys.* 10 (1942) 51-61].

$$v = \frac{[\ln(1 - V_r) + V_r + \chi V_r^2]}{-2 \cdot \rho_p \cdot V_s (V_r)^{1/3}}$$

where Vs=105.91 is the molar volume of toluene and $\chi$ is the solvent-polymer interaction parameter of Flory which is 0.43 for toluene-isoprenic rubber (IR).

The static mechanical properties were measured at 23° C. according to the ISO 37:2005 standard.

In particular, the 100% elongation load, referred to as CA1, the load at break CR and the elongation at break AR % were measured on samples of the elastomeric materials mentioned above.

Tensile tests were performed on dumbbell-type straight-line specimens (ISO37-2011, T=23° C.) or on ring specimens (ISO37-2011, T=23° C.).

The dynamic mechanical properties were measured according to the following methods:

Dynamic modules E (tensile/compression): they were measured using an Instron dynamic device in compression-traction mode according to the following procedure. A sample of the subject vulcanised elastomeric compounds having a cylindrical shape (length=25 mm; diameter=18 mm), subjected to pre-load compression up to 25% of the longitudinal deformation with respect to the initial length and maintained at the predetermined temperature (equal to +23° C. or 70° C.) for the whole duration of the test, was subjected to a dynamic sinusoidal strain having an amplitude of ±3.5% with respect to the length under pre-load, with a frequency of 100 Hz. The dynamic elastic properties were expressed in terms of elastic (E'), viscous (E") and Tan delta (loss factor E"/E') tensile/compression dynamic modulus. The Tan delta value was calculated as the ratio between the viscous dynamic module (E") and the dynamic elastic modulus (E'), both being determined by the above dynamic measurements.

G (shear) dynamic modules: they were measured using a Monsanto RPA rheometer 2000 according to the following method: cylindrical test specimens with weights in the range of 4.5 to 5.5 g were obtained by punching the vulcanisable elastomeric composition of the samples and their vulcanisation in the instrument "RPA" (at 170° C. for 10 minutes). The vulcanised samples were subjected to dynamic measurement of the elastic shear modulus (G') at 70° C., 10 Hz frequency, 0.1% and 10% strain.

The dynamic elastic properties were expressed in terms of elastic (G'), viscous (G") and Tan delta (loss factor G"/G') shear dynamic modulus.

Example 1

Preparation of Activating Fillers (ZnO/$SiO_2$) According to the Prior Art

ZnO/$SiO_2$ activating fillers were prepared by the following procedure described in Chemical Engineering Journal 275 (2015) 245-252.

Powdered silica (0.426 moles, precipitated silica Rhodia Zeosil MP1165, specific surface area BET 160 $m^2/g$), was dispersed in 0.90 L of anhydrous ethanol by sonication for 10 min (pulses: 1 s; 20 kHz). Subsequently, Zn($CH_3COO)_2$ was added to the silica suspension. $2H_2O$ (quantity in Table 1) and NaOH (0.10 mol) under stirring, at 65° C.:

TABLE 1

| Sample | Zn acetate. $2H_2O$ (mol) | ZnO content (% by weight) |
|---|---|---|
| 1A | 0.205 | 14.2 |
| 1B | 0.081 | 7.7 |
| 1C | 0.015 | 4.0 |

The ZnO nanoparticles, originated by hydrolysis, condensed on the silica surface forming samples with different amounts of zinc. After 20 minutes, the solid ZnO/$SiO_2$ particles were filtered, then washed four times with ethanol and air dried at room temperature.

Example 2

Preparation of Fillers Activating the Vulcanisation (ZnO/$SiO_2$)

1.2 litres of ethanol, 4.7 g of NaOH and 8.9 g of zinc acetate dihydrate under stirring were introduced into a 3-liter flask until completely dissolved. The solution thus obtained was heated up to 65° C., until it became milky due to the probable formation of zinc compounds of the [Zn(OH)n]$^{n+}$ type. 17.06 g of silica were then added (Rhodia Zeosil MP1165, BET specific surface area 160 $m^2/g$), maintaining the temperature at 65° C. for 20 minutes under stirring. The suspension was then filtered through filter, washing the solid with 200 ml of ethanol three times, finally drying the product in air at room temperature.

19.4 g of solid consisting of silica nanoparticles were obtained, with a ZnO load of about 12.3% by weight.

Example 3

Preparation of Fillers Activating the Vulcanisation (ZnO/Sepiolite)

1 g of sepiolite was dispersed in 50 ml of 0.01 M NaOH and left under stirring at room temperature for 24 h. The dispersion was centrifuged at 9000 rpm for 30 min. The precipitate was dispersed several times in deionized water to allow an optimal washing and recovered again by centrifugation up to neutral pH. The solid was dried by lyophilisation. In another flask, 140 ml of ethanol and 0.56 g of NaOH (conc. NaOH=0.1 M) were added and stirred at 65° C. for 10 min. After dissolving the soda, zinc acetate dihydrate (0.39 g) was added and left under stirring until the solution became cloudy. Finally, 1 g of previously treated sepiolite was added and left under stirring for 20 minutes.

The product was filtered on Buchner, washed 3 times with fresh ethanol and dried in a stove overnight at 80° C.

Characterisation of Vulcanisation Activating Fillers (D)

Samples of the activating fillers prepared in Example 2 were subjected to the following assays:

TABLE 2

| Analytical method | Result | Property |
|---|---|---|
| X-ray diffraction (XRD) | No signal | Amorphous state of ZnO |
| UV-Visible absorption (UV-Vis) | 3.29-3.47 eV | Energy absorption of ZnO particles (micro vs nano) |
| Total attenuated reflectance (ATR-FTIR) | 963-965 $cm^{-1}$ | Absence of the signal related to silanols (Si—OH) |
| Inductively coupled plasma mass spectroscopy (ICP) | 9-13% by weight | Amount of ZnO anchored on silica |

Example 4

Preparation of Synthetic Isoprene-Based Elastomeric Compounds for Under-Layer

In this example, a comparison was made between a conventional compound for an under-layer comprising a traditional filler (silica) and an activating agent (ZnO microcrystalline) (Comparative 4.1), a compound comprising an activating filler (ZnO/$SiO_2$) but prepared according to a standard process with simultaneous addition of the silane (Comparative 4.2), a compound comprising an activating filler (ZnO/SiO2) prepared by adding the silane together with said filler and only after the stearic acid (Comparative 4.3, as described in Chem. Eng., 2015, 245, page 247, par. 2.4) and a compound according to the invention (Example 4.4), in which the silane was added at a later step, when the stearic acid had completely reacted with the zinc of the activating filler.

The elastomeric compounds of Examples 4.1-4.4 below were prepared according to the methods described herein. The quantities of the various components are indicated in phr and shown in the following Table 3:

TABLE 3

| Step | Ingredients | Comp. 4.1 | Comp. 4.2 | Comp. 4.3 | Inv. 4.4 | ZnO content |
|---|---|---|---|---|---|---|
| 1-0 | IR | 100 | 100 | 100 | 100 | |
| 1-1 | Silica | 40 | 26.9 | 26.9 | 26.9 | |

TABLE 3-continued

| Step | Ingredients | Comp. 4.1 | Comp. 4.2 | Comp. 4.3 | Inv. 4.4 | ZnO content |
|---|---|---|---|---|---|---|
| 1-1 | Stearic acid | 2 | 2 | — | 2 | |
| 1-1 | 6PPD | 2 | 2 | 2 | 2 | |
| 1-1 | Silane | — | — | 3.2 | — | |
| 1-1 | ZnO/SiO$_2$ Ex. 2 (12.3%) | — | — | 14.9 | — | 1.84 |
| 1-2 | ZnO/SiO$_2$ Ex. 2 (12.3%) | — | 14.9 | — | 14.9 | 1.84 |
| 1-2 | Stearic acid | — | — | 2 | — | |
| 1-2 | ZnO (80%) | 2.3 | — | — | — | 1.84 |
| 1-2 | Silane | — | 3.2 | — | — | |
| 1-3 | Silane | 3.2 | — | — | 3.2 | |
| 2-0 | CBS | 1.6 | 1.6 | 1.6 | 1.6 | |
| 2-0 | Sulphur (67%) | 3 | 3 | 3 | 3 | | wherein:

IR: high-cis synthetic polyisoprene (min. 96%), obtained by polymerisation in solution with Ziegler/Natta catalyst; Supplier NIZHNEKAMSKNEFTECHIM EXPORT;
Silica: ZEOSIL 1115 MP (specific surface area BET 95-120 m$^2$/g, white microbeads obtained by precipitation from sodium silicate solutions with sulphuric acid. It does not contain crystalline silica. Supplier SOLVAY RHODIA OPERATIONS
Stearic acid: Supplier TEMIX OLEO SRL
6PPD: N-(1,3-dimethylbutyl)-N'-phenyl-p-phenylenediamine, Supplier: SOLUTIA/EASTMAN
ZnO (80): 80% zinc oxide, 20% polymeric binder and dispersing agent, Supplier LANXESS ADD
silane: TESPD Bis-(3-triethoxy-silyl-propyl)disulphide, Supplier JINGZHOU JIANGHAN FINE CHEM
CBS: N-cyclohexyl-2-benzothiazilsulphenamide, cyclohexylamine content<1%, DUSLO Supplier
sulphur: Crystex OT33 amorphous sulphur, insoluble in CS2 and in toluene. Treated with 33% hydrotreated heavy naphthenic distillate (petroleum), Supplier EASTMAN.

The mixing was carried out in several steps using an internal Thermo Haake Reomix laboratory tangential rotor mixer (250 ml mixing chamber).

In the first step (1-0) the elastomeric polymers were introduced and chewed for 30 seconds at 60° C. (set temperature).

In the following step (1.1) the traditional filler, the antioxidant and possibly the stearic acid, the activating filler, the silane were added.

The mixing continued for 2 minutes, until reaching 120° C.±5° C.

After 12-24 hours, in the following step (1.2) carried out using the same mixer, the ZnO (Comparative 4.1) or the activating filler ZnO/SiO$_2$ (Comparative 4.2, Comparative 4.3 and Invention 4.4) were introduced, for the Comparative 4.2 the silane and for the Comparative 4.3 the stearic acid. The mixing was continued for about 2 minutes, until the reaction between stearic acid and zinc was completed, reaching 125° C.±5° C. In the following step 1.3, for some examples the silane was added and the mixing was prolonged for another 2-3 minutes, after which the compounds were discharged.

After 12-24 hours, in step (2), carried out using the same mixer, the vulcanising agent (Sulphur) and the accelerant were introduced, and the mixing continued for about 2 minutes, until reaching 95° C.±5° C., when the compounds were discharged. The elastomeric compounds 4.1-4.4 prepared above were evaluated for the behaviour in vulcanisation (170° C., 10 min) and subsequently, in terms of static and dynamic mechanical properties, according to the methods described above. The results of these tests, recalculated considering 100 the value obtained with Comparative 4.1, are summarised in the following Table 4:

TABLE 4

| Measured parameter | Unit | Comp. 4.1 | Comp. 4.2 | Comp. 4.3 | Inv. 4.4 |
|---|---|---|---|---|---|
| In vulcanisation | | | | | |
| MH | dNm | 100 | 93 (−7%) | 93 (−7%) | 97 (−3%) |
| MH-ML | dNm | 100 | 84 (−16%) | 102 (+2%) | 99 (−1%) |
| T-MH | min. | 100 | 65 (−35%) | 77 (−23%) | 100.6 (+0.6%) |
| After vulcanisation | | | | | |
| Tan D at 70° C., 10 Hz, 9% | — | 100 | 69 (−31%) | 113 (+13%) | 54 (−46%) |
| G' at 70° C., 10 Hz, 9% | KPa | 100 | 88 (−12%) | 95 (−5%) | 86 (−14%) |
| G" at 70° C., 10 Hz, 9% | KPa | 100 | 61 (−39%) | 107 (+7%) | 47 (−53%) |
| CR | MPa | 100 | n.a. | 82 (−18%) | 110 (+10%) |
| CA1 | MPa | 100 | n.a. | 65 (−35%) | 107 (+7%) | wherein
MH (maximum torque): is the torque measured when cross-linking can be considered complete;
MH-ML: difference between maximum torque MH and minimum torque ML;
T-MH: it is the time necessary to reach the complete cross-linking of the sample;
Tan D (hysteresis) was calculated as the ratio of the G"/G' modules (deformation of 9% at 70° C.);
G' (9%) is the shear elastic modulus measured at 70° C. at a deformation amplitude of 9%;
G" (9%) is the viscous shear modulus measured at 70° C. at a deformation amplitude of 9%;
CR indicates the stress at the elongation at break (MPa);
CA1 indicates the stress measured at 100% deformation (MPa);
n.a. not measured.

From the values of MH, CR and CA1 reported in Table 4 it is shown that the activating filler ZnO/SiO$_2$ guaranteed at least the same mechanical and kinetic vulcanisation properties of the standard microcrystalline ZnO system, with the same quantity of Zn and filler (Invention 4.4 vs Comparative 4.1).

Moreover, due to the modification in the order of addition of the ingredients of the present process, i.e. with the early addition of stearic acid in step 1.1 and, in particular, the delayed introduction of silane in step 1.3, it was observed that the vulcanised compound of the invention (4.4) showed a significant decrease of the tan D and of the viscous shear modulus (G") at 70° C. (10 Hz and 9%) of 46% and 53% respectively. These properties are predictive of a decrease in the rolling resistance during operation, which results in increased tyre travel and therefore greater environmental sustainability.

If, on the other hand, the silane was added at the same time as the $ZnO/SiO_2$ in step 1.2, as in the mixture of Comparative 4.2, the reduction of tan D and modulus G" at 70° C. was only 31% and 39%.

Comparative 4.3 shows the negative effects of adding $ZnO/SiO_2$ together with silane, in particular on G" values at 70° C., where we can even see a 7% increase compared to the significant reduction (−53%) of the sample according to the invention (4.4).

Example 5

Preparation of Elastomeric Compounds Based on Synthetic Isoprene and Polybutadiene for Tyre Sidewall.

In this example it was decided to evaluate, for the same process according to the invention, the effect of the incorporation of the $Zn/SiO_2$ filler with respect to the traditional ZnO on the vulcanisation parameters and on the mechanical properties of a synthetic isoprene-based compound 40% and high cis polybutadiene 60%.

The elastomeric compounds of Examples 5.1 and 5.2 below were prepared according to the methods described herein. The quantities of the various components are indicated in phr and shown in the following Table 5:

TABLE 5

| Step | Ingredients | Comp. 5.1 | Inv. 5.2 | ZnO content |
|---|---|---|---|---|
| 1-0 | IR | 40 | 40 | |
| 1-0 | BR | 60 | 60 | |
| 1-1 | Silica | 40 | 26.9 | |
| 1-1 | Stearic acid | 2 | 2 | |
| 1-1 | 6PPD | 2 | 2 | |
| 1-2 | $ZnO/SiO_2$ Ex. 2 (12.3%) | — | 14.9 | 1.84 |
| 1-2 | ZnO (80): | 2.3 | — | 1.84 |
| 1-3 | Silane | 3.2 | 3.2 | |
| 2-0 | CBS | 1.6 | 1.6 | |
| 2-0 | Sulphur (67%) | 3 | 3 | | wherein:
BR butadiene with high cis content (97.5%), neodymium polymerised, Supplier ARLANXEO; and the other ingredients are the same as in the previous example 4.

The mixing was carried out in several steps as described in Example 4 by adding the ingredients in the quantities, in the step and in the order indicated in Table 5, in particular by adding the stearic acid (1.1) early and the silane (1.3) later.

The elastomeric compounds 5.1-5.2 thus prepared above were evaluated for the behaviour in vulcanisation (170° C., 10 min) and subsequently, in terms of static and dynamic mechanical properties, according to the methods described above. The results, recalculated considering 100 the value obtained with Comparative 5.1, are summarised in the following Table 6:

TABLE 6

| Measured parameter | Unit of measurement | Comp. 5.1 | Inv. 5.2 |
|---|---|---|---|
| In vulcanisation | | | |
| ML | | 100 | 84.6 (−15.4%) |
| MH | dNm | 100 | 110.7 (+10.7%) |
| MH-ML | dNm | 100 | 116.5 (+16.5%) |
| T-MH | min. | 100 | 87.8 (−12.2%) |
| After vulcanisation | | | |
| Tan D at 70° C., 10 Hz, 9% | — | 100 | 79 (−21%) |
| G' at 70° C., 10 Hz, 9% | KPa | 100 | 95 (−5%) |
| G" at 70° C., 10 Hz, 9% | KPa | 100 | 75 (−25%) |
| DG' at 70° C., 10 Hz, 9% and 3% | KPa | 100 | 94 (−6%) | wherein
DG' at 70° C., 10 Hz, 9% and 3% is the difference in shear modulus measured at 70° C. at a deformation amplitude of 9% or 3% respectively (predictive of rolling resistance) and the other parameters have the meaning shown above.

From the values of MH, G' and DG' shown in Table 6 it is noted that, with the same the preparation process and elastomeric polymers, the activating filler $ZnO/SiO_2$ guaranteed good mechanical properties and a significant decrease of the hot tan Delta, predictive of a decrease in the tyre rolling resistance during operation.

In the process according to the invention (Inv. 5.2) a significant decrease in the T-MH cross-linking time was also observed.

Example 6

Preparation of Elastomeric Compounds Based on Synthetic Isoprene and Polybutadiene for Tyre Sidewall In this example it was decided to evaluate, for the same process according to the invention, the effect of the incorporation of the $Zn/SiO_2$ filler with respect to the traditional ZnO on the vulcanisation parameters and on the mechanical properties of a synthetic isoprene-based compound 40% and high cis polybutadiene 60%, in the presence of a vulcanization system different from the previous one.

The elastomeric compounds of Examples 6.1 and 6.2 below were prepared according to the methods described herein. The quantities of the various components are indicated in phr and shown in the following Table 7:

TABLE 7

| Step | Ingredients | Comp. 6.1 | Inv. 6.2 | ZnO content |
|---|---|---|---|---|
| 1-0 | IR | 40 | 40 | |
| 1-0 | BR | 60 | 60 | |
| 1-1 | Carbon black CB | 17 | 17 | |
| 1-1 | Wax | 1 | 1 | |
| 1-1 | Silica | 20 | 6.88 | |
| 1-1 | Stearic acid | 2 | 2 | |
| 1-1 | 6PPD | 1.5 | 1.5 | |
| 1-2 | $ZnO/SiO_2$ Ex. 2 (12.3%) | — | 14.95 | 1.84 |
| 1-2 | ZnO (80): | 2.3 | — | 1.84 |
| 1-3 | Silane | 1 | 1 | |
| 2-0 | TBBS | 1.87 | 1.87 | |
| 2-0 | Sulphur (67%) | 2 | 2 | |
| 2-0 | 50% TESPT on CB 330 | 2.4 | 2.4 | | wherein:

Carbon black CB: produced with the furnace process, supplier ORION ENGINEERED CARBONS;

Wax: mixture of normal paraffins and iso, with bimodal distribution (can contain at most 1% of polyethylene PE), Supplier REPSOL LUBRICANTES Y ESPECIAL;

TBBS: Nt-butyl-2-benzothiazilsulphenamide, supplier LANXESS; and the other ingredients are the same as the previous examples.

The mixing was carried out in several steps as described in Example 4 by adding the ingredients in the quantities, in the step and in the order indicated in Table 7, in particular by adding the stearic acid (step 1.1) early and the silane (step 1.3) later.

The elastomeric compounds 6.1-6.2 thus prepared above were evaluated as regards the type of cross-linking after vulcanisation (170° C., 10 min) and subsequently, in terms of static and dynamic mechanical properties, according to the methods described above. The results, recalculated considering 100 the value obtained with Comparative 6.1, are summarised in the following Table 8:

TABLE 8

| Measured parameter | Unit of measurement | Comp. 6.1 | Inv. 6.2 |
|---|---|---|---|
| In vulcanisation | | | |
| MH | dNm | 100 | 94.8 (−5.2%) |
| MH-ML | dNm | 100 | 98.3 (−1.7%) |
| After vulcanisation | | | |
| Mono- and disulphides | % w/w | 100 | 111 (+11%) |
| Tan D at 70° C., 10 Hz, 9% | — | 100 | 91 (−9%) |
| G' at 70° C., 10 Hz, 9% | KPa | 100 | 97 (−3%) |
| DG' at 70° C., 10 Hz, 9% and 3% | KPa | 100 | 75 (−25%) |

From the values reported in Table 8 it is noted that, all the variables being equal, including the vulcanisation system, the ZnO/SiO$_2$ activating filler and the addition methods of the process of the invention guaranteed a noticeable decrease of the hot tan D together to an increase in the mono- and disulphides, with a less hysteretic behaviour of the compound, predictive of a lower resistance to rolling of the tyre during operation.

Example 7

Preparation of Elastomeric Compounds Based on Natural Rubber for Under-Layer

In this example it was decided to evaluate the effect of the incorporation, according to the process of the invention, of the ZnO/SiO$_2$ filler with respect to the traditional ZnO, with the same filler and zinc content, on the vulcanisation parameters and on the mechanical properties of a compound based on natural rubber.

The elastomeric compounds of Examples 7.1 and 7.2 below were prepared according to the methods described herein. The quantities of the various components are indicated in phr and shown in the following Table 9:

TABLE 9

| Step | Ingredients | Comp. 7.1 | Inv. 7.2 | ZnO content |
|---|---|---|---|---|
| 1-0 | NR | 100 | 100 | |
| 1-0 | Stearic acid | 2.0 | 2.0 | |
| 1-1 | Carbon black CB | 23.0 | 23.0 | |
| 1-1 | Silica | 22.8 | — | |
| 1-1 | Stearic acid | 2.0 | 2.0 | |
| 1-1 | ZnO | 3.3 | — | 3.3 |
| 1-1 | ZnO/SiO$_2$ Ex. 2 (12.3%) | — | 26.0 | 3.2 |
| 1-2 | TMQ | 1.3 | 1.3 | |
| 1-2 | 6PPD | 3.0 | 3.0 | |
| 1-2 | Wax | 1.0 | 1.0 | |
| 1-2 | TESPD (silane) | 2.2 | 2.2 | |
| 2-0 | TBBS | 1.3 | 1.3 | |
| 2-0 | PVI | 0.3 | 0.3 | |
| 2-0 | Sulphur (67%) | 4.5 | 4.5 | | wherein:

NR: natural rubber (cis 1,4-polyisoprene), SIR 20, supplier PT. KIRAnA MUSI PERSADA, SFN;

ZnO: microcrystalline, white powder, supplier ZINCOL OSSIDI;

TMQ: polymerised 2,2,4-trimethyl-1,2-dihydroquinoline, supplier LANXESS;

PVI: N-cyclohexyl thiophthalimide, supplier SHANDONG YANGGU HUATAI CHEM, and the other ingredients are the same as the previous examples.

The mixing was carried out in several steps as described in Example 4 by adding the ingredients in the quantities, in the step and in the order indicated in Table 9, in particular by adding the stearic acid (step-0) even earlier and the silane (step 1.2) later.

The elastomeric compounds 7.1-7.2 thus prepared above were evaluated as regards the vulcanisation parameters and subsequently, in terms of static and dynamic mechanical properties, according to the methods described above. The results, recalculated considering 100 the value obtained with Comparative 7.1, are summarised in the following Table 10:

TABLE 10

| Measured parameter | Unit of measurement | Comp. 7.1 | Inv. 7.2 |
|---|---|---|---|
| In vulcanisation (170° C., 10 min) | | | |
| T30 | min. | 100 | 59 (−41%) |
| T60 | min. | 100 | 57 (−43%) |
| T90 | min. | 100 | 57 (−43%) |
| T-MH | min. | 100 | 60 (−40%) |
| After vulcanisation (30 min at 151° C.) | | | |
| E" 10° C., 10 Hz, 7.5%-20% | MPa | 100 | 105 (+5%) |
| Tan Delta 10° C., 10 Hz, 7.5%-20% | — | 100 | 111 (+11%) |
| E" 23° C., 10 Hz, 7.5%-20% | MPa | 100 | 105 (+5%) |
| Tan Delta 23° C., 10 Hz, 7.5%-20% | — | 100 | 111 (+11%) |
| E" 100° C. 10 Hz 7.5%-20% | MPa | 100 | 95 (−5%) |
| Tan Delta 100° C., 10 Hz 7.5%-20% | — | 100 | 100 (0%) |
| (170° C., 10 min) traction on ring specimens | | | |
| CR | MPa | 100 | 114 (+14%) |
| AR | % | 100 | 117 (+17%) | wherein:

T30, T60, T90 and T-MH are the time required to reach respectively 30% (T30), 60% (T60), 90% (T90) and 100% (T-MH) of the maximum torque value (MH);

E" is the viscous tensile/compression dynamic modulus,

E' is the elastic tensile/compression dynamic module,

Tan delta is the ratio between the viscous dynamic module (E") and the dynamic elastic modulus (E'), AR is elongation at break.

From the values shown in Table 10 it is noted that, all other variables being equal, the activating filler ZnO/SiO$_2$ gave the compound of the invention of Ex. 7.2 better static mechanical properties (CR and AR, respectively increased by 14% and 17%) and a faster vulcanisation kinetics with respect to the compound of Comparative 7.1, comprising conventional microcrystalline ZnO (compare the values of T30, T60, T90 and T-MH). The differences in vulcanisation kinetics can be appreciated from the pattern of the graph curves shown in FIG. 5.

The ZnO/SiO$_2$ activating filler and the preparation process according to the invention led to an increase in hysteresis at temperatures of 23° C. and 10° C. of the vulcanised compounds, with a corresponding increase in the module E", predictive of better tire performance on the wet. Otherwise, at 100° C. a hysteresis similar to the reference was observed, predictive of a comparable resistance to rolling and abrasion of the tyre during operation.

Example 8

Preparation of Elastomeric Compounds Based on Natural Rubber for Under-Layer

In this example, a comparison was made between two traditional comparative under-layer compounds—including traditional (silica) and activating (microcrystalline ZnO) (Comparative 8.1 and 8.2) prepared the first according to the present process with early addition of ZnO and silica and subsequent silane (step 1.2) and the second with a different process, in which the silane and silica are introduced initially in step 1.1 and the ZnO and stearic acid subsequently in step 2.0—with a compound according to the invention, comprising instead the activating filler ZnO/SiO$_2$ (D) and prepared with the late addition of silane (step 1.2) (Invention 8.3). The elastomeric compounds of Examples 8.1-8.3 below were prepared according to the methods described herein. The quantities of the various components are indicated in phr and shown in the following Table 11:

TABLE 11

| Step | Ingredients | Comp. 8.1 | Comp. 8.2 | Inv. 8.3 | ZnO content |
|---|---|---|---|---|---|
| 1-0 | NR | 100 | 100 | 100 | |
| 1-0 | Stearic acid | 2.0 | — | 2.0 | |
| 1-1 | ZnO | 2.6 | — | — | 2.6 |
| 1-1 | Carbon black CB | 23.0 | 23.0 | 23.0 | |
| 1-1 | Silica | 18.2 | 18.2 | — | |
| 1-1 | TESPD | — | 1.4 | — | |
| 1-1 | ZnO/SiO$_2$ Ex. 2 (12.3%) | — | — | 20.7 | 2.6 |
| 1-2 | TMQ | 1.3 | 1.3 | 1.3 | |
| 1-2 | 6PPD | 3.0 | 3.0 | 3.0 | |
| 1-2 | Wax | 1.0 | 1.0 | 1.0 | |
| 1-2 | TESPD | 1.4 | — | 1.4 | |
| 2-0 | ZnO | — | 2.6 | — | 2.6 |
| 2-0 | Stearic acid | — | 2.0 | — | |
| 2-0 | TBBS | 1.3 | 1.3 | 1.3 | |
| 2-0 | PVI | 0.3 | 0.3 | 0.3 | |
| 2-0 | Sulphur (67%) | 4.5 | 4.5 | 4.5 | | where the ingredients are the same as in the previous examples.

The mixing was carried out in several steps as described in Example 4 by adding the ingredients in the quantities, in the step and in the order indicated in Table 11.

The elastomeric compounds 8.1-8.3 thus prepared above were evaluated as regards the vulcanisation parameters and subsequently, in terms of static and dynamic mechanical properties, according to the methods described above. The results, recalculated considering 100 the values obtained with Comparative 8.1, are summarised in the following Table 12:

TABLE 12

| Measured parameter | Unit of measurement | Comp. 8.1 | Comp. 8.2 | Inv. 8.3 |
|---|---|---|---|---|
| In vulcanisation (170° C., 10 min) | | | | |
| ML (23° C.) | dN m | 100 | 100 | 83 (−17%) |
| T30 | min. | 100 | 89 (−11%) | 67 (−33%) |
| T60 | min. | 100 | 87 (−13%) | 65 (−35%) |
| T90 | min. | 100 | 86 (−14%) | 67 (−33%) |
| After vulcanisation (30 min at 151° C.) | | | | |
| E" 10° C., 10 Hz, 7.5%-20% | MPa | 100 | 100 (0%) | 109 (+9%) |
| Tan Delta 10° C., 10 Hz, 7.5%-20% | — | 100 | 98 (−2%) | 112 (+12%) |
| E" 23° C., 10 Hz, 7.5%-20% | MPa | 100 | 99 (−1%) | 109 (+9%) |
| Tan Delta 23° C., 10 Hz, 7.5%-20% | — | 100 | 96 (−4%) | 112 (+12%) |
| E" 100° C. 10 Hz 7.5%-20% | MPa | 100 | 95 (−5%) | 87 (−13%) |
| Tan Delta 100° C., 10 Hz 7.5%-20% | — | 100 | 91 (−9%) | 91 (−9%) |
| Traction on ring specimens | | | | |
| CR | MPa | 100 | 98 (−2%) | 99 (−1%) |
| AR | % | 100 | 94 (−6%) | 106 (+6%) |

From the values shown in Table 12 it is noted that, all other variables being equal, the compound of the invention (Ex. 8.3, process of the invention, activating filler ZnO/SiO$_2$) with respect to the comparative compounds of Ex. 8.1 (process of the invention but standard microcrystalline ZnO) and of Ex. 8.2 (standard process and standard microcrystalline ZnO) showed an increase in hysteresis at 10° C. and 23° C., with an increase in module E″, predictive of a good tyre behaviour on the wet and a significant reduction at high temperatures (100° C.), mainly due to the decrease of the E′ module, predictive instead of improved rolling and abrasion resistance of the tyre in use.

Furthermore the compound of the invention Ex. 8.3 showed a significant decrease in the vulcanisation time (see the values of T30-T90).

Considering the vulcanisation times reported in Table 12 (T30-T90) an increase was observed switching from a standard compound (Comparative Ex. 8.2, standard zinc process and compound) with the compound of Ex. Comparative 8.1 (standard process of the invention and zinc compound) to indicate how the late addition of the compatibilising agent characterising the present process does not lead by itself to an increase in the cross-linking speed but, surprisingly, only in the specific case of the use of zinc in the form of an activating ZnO/SiO$_2$ filler.

The differences in vulcanisation kinetics can be appreciated also from the pattern of the graph curves shown in FIG. 6.

FIG. 6 shows the normalized curve of the torque values [(Sx−Smin)/(Smax−Smin)*100] measured over time (min) during vulcanization at 170° C. for 10 min of the vulcanisable compound according to the invention of Ex. 8.3 with respect to the comparative compounds of Ex. 8.1 and 8.2. As can be seen, the sample of the invention 8.3 shows the faster vulcanisation kinetics compared to both the comparatives 8.2 and 8.1.

Furthermore it is noted that the microcrystalline zinc introduced in step 1.1. of Ex. 8.1 results in slower kinetics.

The invention claimed is:

1. A process for preparing a vulcanisable elastomeric compound for tyres, said process comprising at least:
   mixing (1) at least one elastomeric polymer (A) and at least one additive for elastomeric compounds, with the exception of vulcanising agents (B), to produce a non-vulcanisable elastomeric compound;
   mixing (2) the non-vulcanisable elastomeric compound and at least one vulcanising agent (B), to give a vulcanisable elastomeric compound; and
   unloading of the vulcanisable elastomeric compound,
   wherein in one or more of the mixing steps, adding at least one fatty acid (C), at least one product (D) comprising zinc directly bound to a white filler and at least one compatibilising agent (E), and
   wherein the at least one compatibilising agent (E) is added after the complete addition and processing of the at least one fatty acid (C) and at least one product (D) comprising zinc directly bound to a white filler.

2. The process as claimed in claim 1, wherein the at least one fatty acid (C), the at least one product (D) comprising zinc directly bound to a white filler, and the at least one compatibilising agent (E) are all added in the mixing step (1).

3. The process as claimed in claim 1, wherein the at least one fatty acid (C) and the at least one product (D) comprising zinc directly bound to a white filler are added in the mixing step (1) and the at least one compatibilising agent (E) is added in the mixing step (2).

4. The process as claimed in claim 1, wherein the processing of the at least one fatty acid (C) and the at least one product (D) comprising zinc directly bound to a white filler is carried out at a compound temperature at least equal to the melting temperature of the fatty acid (C) or higher.

5. The process as claimed in claim 1, wherein the mixing step (2) is carried out at a compound temperature lower than 160° C.

6. The process as claimed in claim 1, wherein:
   the at least one diene elastomeric polymer (A) is chosen from 1,4-polyisoprene, 3,4-polyisoprene, polybutadiene, optionally halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, and mixtures thereof
   the vulcanising agent (B) is chosen from sulphur and sulphur donors and when sulphur donors, the sulphur donors are chosen from caprolactam disulfide (CLD), bis[(trialkoxysilyl)propyl]polysulphides, dithiophosphates, phosphorylpolysulphide (SDT), and mixtures thereof.

7. The process as claimed in claim 1, wherein the fatty acid (C) is chosen from saturated or unsaturated fatty acids ranging from 8 to 26 carbon atoms, esters thereof, salts thereof, and mixtures thereof.

8. The process as claimed in claim 1, wherein the zinc in the product (D) is present as zinc oxide.

9. The process as claimed in claim 1, wherein the white filler of the product (D) is chosen from silica and silicates and when silicates, the silicates are chosen from bentonite, nontronite, beidellite, volkonskoite, ectorite, saponite, sauconite, vermiculite, sericite, sepiolite, paligorskite or attapulgite, montmorillonite, halloysite, optionally modified by acid treatment and/or derivatised, and mixtures thereof.

10. The process as claimed in claim 1, wherein the product (D) comprising zinc directly bound to a white filler is zinc oxide on silica.

11. The process as claimed in claim 1, wherein the compatibilising agent (E) is a silane chosen from those having at least one hydrolysable group, of general formula (I):

$$(R)_3Si-C_nH_{2n}-X \qquad (I)$$

wherein the R groups, which may be the same or different, are chosen from alkyl, alkoxy or aryloxy groups or from halogen atoms, and provided that at least one of the R groups is an alkoxy or aryloxy group or a halogen; n is an integer ranging from 1 to 6; X is a group chosen from nitrous, mercapto, amino, epoxide, vinyl, imide, chlorine, —(S)$_m$C$_n$H$_{2n}$—Si—(R)$_3$ and —S—COR, wherein m and n are integers ranging from 1 to 6 and the R groups are as defined.

12. The process as claimed in claim 1, wherein:
   the fatty acid (C) is added in a total amount ranging from 0.05 to 20 phr;
   the product (D) comprising zinc directly bound to a white filler is added in a total amount ranging from 1 to 100 phr; and
   the compatibilising agent (E) is added in a total amount ranging from 0.1 phr to 20 phr.

13. The process as claimed in claim 1, further comprising adding one or more further additives, and the one or more further additives are chosen from vulcanisation accelerants (F), vulcanisation retardants (G), reinforcing fillers (H), antioxidants (I), waxes (L) and plasticisers (M).

14. A vulcanisable elastomeric compound obtained according to the process as of claim 1.

15. The vulcanisable elastomeric compound as claimed in claim 14, wherein zinc is present in an amount of less than 4 phr.

16. A tyre component comprising the vulcanisable compound as claimed in claim 14 or the vulcanised compound obtained by vulcanisation thereof.

17. The tyre component as claimed in claim 16, wherein the tyre component is chosen from tread band, under-layer, anti-abrasive elongated element, sidewall, sidewall insert, mini-sidewall, under-liner, rubber layers, bead filler, and sheet.

18. A tyre for vehicle wheels comprising at least one tyre component as claimed in claim 17.

* * * * *